United States Patent
Su

(10) Patent No.: US 11,194,678 B2
(45) Date of Patent: Dec. 7, 2021

(54) METHOD AND APPARATUS FOR PERFORMING NODE INFORMATION EXCHANGE MANAGEMENT OF ALL FLASH ARRAY SERVER

(71) Applicant: Silicon Motion, Inc., Hsinchu County (TW)

(72) Inventor: Zheng-Jia Su, Changhua County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 17/151,220

(22) Filed: Jan. 18, 2021

(65) Prior Publication Data
US 2021/0271576 A1 Sep. 2, 2021

Related U.S. Application Data

(60) Provisional application No. 62/983,769, filed on Mar. 2, 2020.

(51) Int. Cl.
*G06F 11/00* (2006.01)
*G06F 11/20* (2006.01)
*G06F 13/40* (2006.01)

(52) U.S. Cl.
CPC ........ *G06F 11/201* (2013.01); *G06F 11/2043* (2013.01); *G06F 13/4027* (2013.01); *G06F 2201/805* (2013.01)

(58) Field of Classification Search
CPC .. G06F 11/2002; G06F 11/201; G06F 11/202; G06F 11/2023; G06F 11/2038;
(Continued)

(56) References Cited

U.S. PATENT DOCUMENTS 10,983,930 B1* 4/2021 Ravich ............... G06F 13/1668
2010/0074264 A1* 3/2010 Davis ................. G06F 13/4221
370/401

(Continued)

FOREIGN PATENT DOCUMENTS

CN 104102559 A * 10/2014

OTHER PUBLICATIONS

Kazmi, "Non-Transparent Bridging Makes PCI-Express HA Friendly", Aug. 14, 2003, EE Times (Year: 2003).*

*Primary Examiner* — Michael Maskulinski
(74) *Attorney, Agent, or Firm* — Winston Hsu

(57) ABSTRACT

A method and apparatus for performing node information exchange management of an all flash array (AFA) server are provided. The method may include: utilizing a hardware manager module among multiple program modules running on any node of multiple nodes of the AFA server to control multiple hardware components in a hardware layer of the any node, for establishing a Board Management Controller (BMC) path between the any node and a remote node among the multiple nodes; utilizing at least two communications paths to exchange respective node information of the any node and the remote node, to control a high availability (HA) architecture of the AFA server according to the respective node information of the any node and the remote node, for continuously providing a service to a user of the AFA server; and in response to malfunction of any communications path, utilizing remaining communications path(s) to exchange the node information.

11 Claims, 11 Drawing Sheets

(58) Field of Classification Search
CPC ............. G06F 11/2043; G06F 11/2046; G06F 11/2048
See application file for complete search history.

(56) References Cited

U.S. PATENT DOCUMENTS

2013/0173839 A1* 7/2013 Li ........................ G06F 3/0689
710/316
2018/0074717 A1* 3/2018 Olarig ................. G06F 11/2028

* cited by examiner

METHOD AND APPARATUS FOR PERFORMING NODE INFORMATION EXCHANGE MANAGEMENT OF ALL FLASH ARRAY SERVER

CROSS REFERENCE TO RELATED APPLICATIONS

This application claims the benefit of U.S. Provisional Application No. 62/983,769, which was filed on Mar. 2, 2020, and is included herein by reference.

BACKGROUND OF THE INVENTION

1. Field of the Invention

The present invention is related to memory control, and more particularly, to a method for performing node information exchange management of an all flash array (AFA) server, and associated apparatus such as the AFA server, a control circuit thereof, etc.

2. Description of the Prior Art

A data storage server may be arranged to store user data of one or more users, and various control methods regarding the data storage server have been proposed in the related art in order to bring good user experience to the users. As Flash memories have been widely applied to various data storage device such as solid state drives (SSDs), etc., it is proposed in the related art to implement the data storage server to be a Flash type data storage server using Flash memories as storage media thereof, such as an AFA server having multiple SSDs installed therein. However, some problems may occur. For example, the management of accessing the Flash memory in any SSD of the multiple SSDs is complicated. To ensure that the access control of the Flash memory in this SSD conforms to associated specifications, the controller of the Flash memory in this SSD is usually equipped with some management mechanisms to properly manage the internal operations thereof. Although SSD manufactures may have tried to make SSDs seem to be a good solution for replacing hard disk drives (HDDs), some characteristics of the SSDs are quite different from that of the HDDs. As a result, the control methods mentioned above may become improper or invalid, causing the overall performance of the AFA server to be degraded. Thus, a novel method and associated architecture are needed for solving the problems without introducing any side effect or in a way that is less likely to introduce a side effect.

SUMMARY OF THE INVENTION

It is therefore an objective of the present invention to provide a method for performing node information exchange management of an all flash array (AFA) server, and associated apparatus (e.g. the AFA server, a control circuit thereof, etc.), in order to solve the above-mentioned problems.

It is another objective of the present invention to provide a method for performing node information exchange management of an AFA server, and associated apparatus (e.g. the AFA server, a control circuit thereof, etc.), in order to protect data in the AFA server and guarantee correct high availability control thereof.

At least one embodiment of the present invention provides a method for performing node information exchange management of an AFA server, where the method may comprise: utilizing a hardware manager module among multiple program modules running on any node of multiple nodes of the AFA server to control multiple hardware components in a hardware layer of the any node, for establishing a Board Management Controller (BMC) path between the any node and a remote node among the multiple nodes, wherein the multiple hardware components in the hardware layer of the any node comprise a BMC, and the BMC path is established between the BMC of the any node and a corresponding BMC of the remote node; utilizing at least two communications paths to exchange respective node information of the any node and the remote node, to control a high availability (HA) architecture of the AFA server according to the respective node information of the any node and the remote node, for continuously providing a service to a user of the AFA server, wherein the at least two communications paths comprise a Non-Transparent Bridge (NTB) path and the BMC path, and the NTB path is established between a NTB communications circuit of the any node and a corresponding NTB communications circuit of the remote node; and in response to malfunction of any communications path of the at least two communications paths, utilizing at least one remaining communications path of the at least two communications paths to exchange the respective node information of the any node and the remote node, to control the HA architecture of the AFA server according to the respective node information of the any node and the remote node, for continuously providing the service to the user.

At least one embodiment of the present invention provides an all flash array (AFA) server. The AFA server may comprise multiple nodes and a plurality of storage devices. More particularly, any node of the multiple nodes comprises: at least one processor, arranged to control operations of the any node under control of multiple program modules; and multiple hardware components in a hardware layer of the any node, wherein the multiple hardware components in the hardware layer of the any node comprise a Board Management Controller (BMC) and a Non-Transparent Bridge (NTB) communications circuit. The plurality of storage devices may comprise multiple groups of storage devices, for storing data for the AFA server. For example, the any node utilizes a hardware manager module among multiple program modules running on the any node to control the multiple hardware components in the hardware layer of the any node, for establishing a BMC path between the any node and a remote node among the multiple nodes, wherein the BMC path is established between the BMC of the any node and a corresponding BMC of the remote node; the any node and the remote node utilize at least two communications paths to exchange respective node information of the any node and the remote node, to control a high availability (HA) architecture of the AFA server according to the respective node information of the any node and the remote node, for continuously providing a service to a user of the AFA server, wherein the at least two communications paths comprise a NTB path and the BMC path, and the NTB path is established between the NTB communications circuit of the any node and a corresponding NTB communications circuit of the remote node; and in response to malfunction of any communications path of the at least two communications paths, the any node and the remote node utilize at least one remaining communications path of the at least two communications paths to exchange the respective node information of the any node and the remote node, to control the HA architecture of the AFA server according to the respective node information of the any node and the remote node, for continuously providing the service to the user.

The present invention method and associated apparatus (e.g. the AFA server, a control circuit thereof, etc.) can enhance overall performance, and protect data according to multiple control schemes of the method, and more particularly, guarantee correct high availability control of the AFA server. In addition, the present invention method and associated apparatus can solve the problems of the related art without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
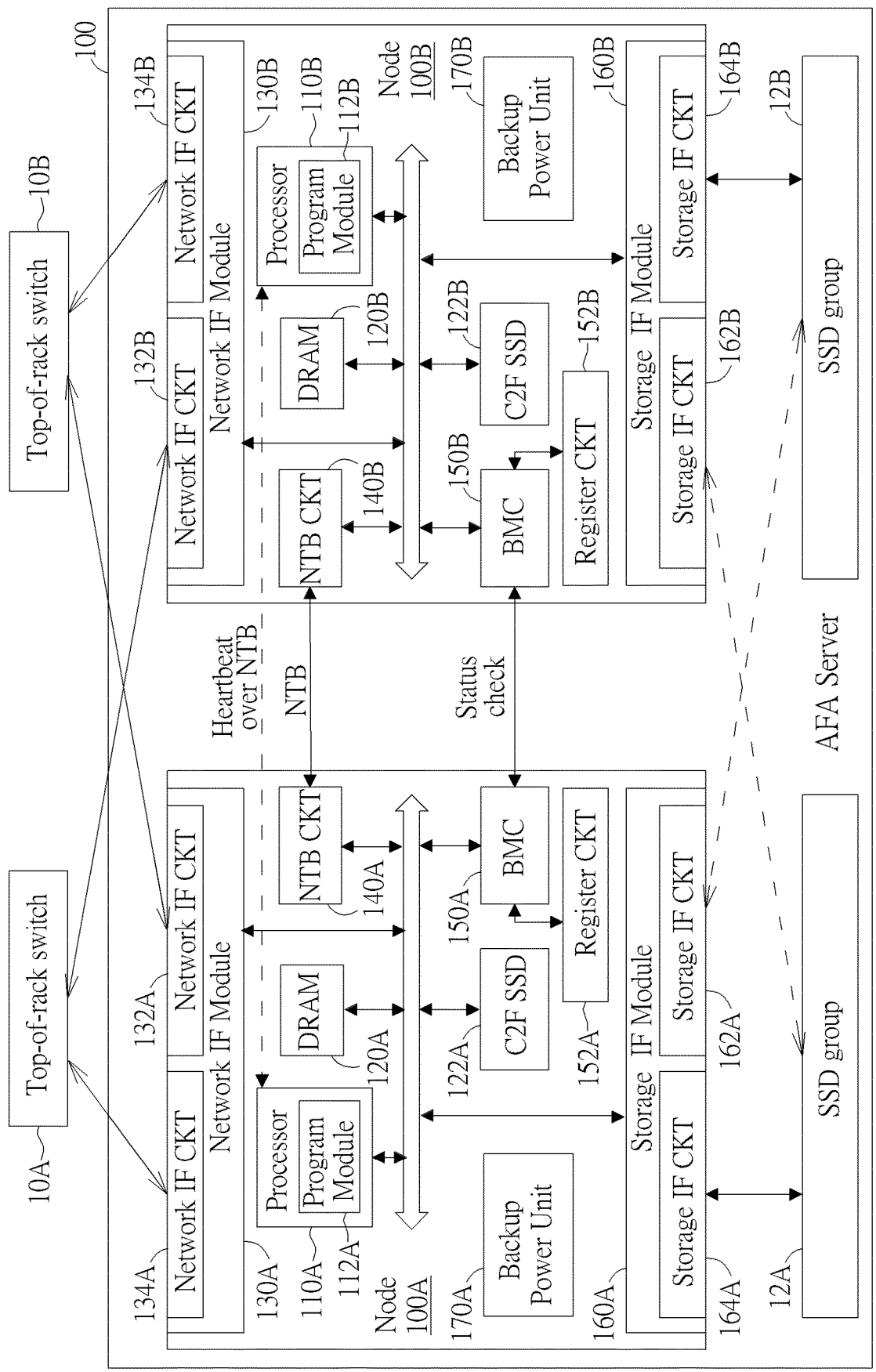
FIG. 1 is a diagram of an all flash array (AFA) server according to an embodiment of the present invention.

FIG. 1 is a diagram of an all flash array (AFA) server 100 according to an embodiment of the present invention. The AFA server 100 may comprise multiple nodes such as two nodes 100A and 100B, where any of the multiple nodes (e.g. one of the nodes 100A and 100B) may have the same or similar architecture as that of another of the multiple nodes (e.g. another of the nodes 100A and 100B). For example, the node 100A may comprise at least one processor (e.g. one or more processors such as one or more Central Processing Units (CPUs)) that may be collectively referred to as the processor 110A, and comprise a Dynamic Random Access Memory (DRAM) 120A, a Copy-to-Flash (C2F) SSD 122A, a network interface (IF) module 130A comprising one or more network interface circuits such as network interface circuits 132A and 134A (respectively labeled "Network IF CKT" for brevity), a Non-Transparent Bridge (NTB) module (or NTB) such as a NTB communications circuit 140A (labeled "NTB CKT" for brevity), a Board Management Controller (BMC) 150A, a register circuit 152A (labeled "Register CKT" for brevity) that is coupled to the BMC 150A, a storage interface (IF) module 160A comprising one or more storage interface circuits such as storage interface circuits 162A and 164A (respectively labeled "Storage IF CKT" for brevity), and a backup power source such as a backup power unit 170A (e.g. a battery), where at least one portion (e.g. a portion or all) of these components may be coupled to each other through a bus of the node 100A, but the present invention is not limited thereto. According to some embodiments, the architecture of the node 100A may vary.

Similarly, the node 100B may comprise at least one processor (e.g. one or more processors such as one or more CPUs) that may be collectively referred to as the processor 110B, and comprise a DRAM 120B, a C2F SSD 122B, a network interface (IF) module 130B comprising one or more network interface circuits such as network interface circuits 132B and 134B (respectively labeled "Network IF CKT" for brevity), a NTB module (or NTB) such as a NTB communications circuit 140B (labeled "NTB CKT" for brevity), a BMC 150B, a register circuit 152B (labeled "Register CKT" for brevity) that is coupled to the BMC 150B, a storage interface (IF) module 160B comprising one or more storage interface circuits such as storage interface circuits 162B and 164B (respectively labeled "Storage IF CKT" for brevity), and a backup power source such as a backup power unit 170B (e.g. a battery), where at least one portion (e.g. a portion or all) of these components may be coupled to each other through a bus of the node 100B, but the present invention is not limited thereto. According to some embodiments, the architecture of the node 100B may vary.

As shown in FIG. 1, the AFA server 100 may further comprise multiple SSDs coupled to the nodes 100A and 100B, such as the SSD groups 12A and 12B. The SSD groups 12A and 12B may be coupled to the nodes 100A and 100B, and may be respectively linked to the nodes 100A and 100B by default, where the dashed lines between the nodes 100A and 100B and the SSD groups 12B and 12A may indicate optional links. For example, the node 100A may utilize the storage interface module 160A to activate the link between the storage interface circuits 164A and the SSD group 12A, for accessing data in the SSD group 12A, and the node 100B may utilize the storage interface module 160B to activate the link between the storage interface circuits 164B and the SSD group 12B, for accessing data in the SSD group 12B. When there is a need, the linking relationships between the nodes 100A and 100B and the SSD groups 12A and 12B may vary. For example, the node 100A may utilize the storage interface module 160A to activate the link between the storage interface circuits 162A and the SSD group 12B, for accessing data in the SSD group 12B, and the node 100B may utilize the storage interface module 160B to activate the link between the storage interface circuits 162B and the SSD group 12A, for accessing data in the SSD group 12A.

The processor 110A running program modules 112A can be configured to control operations of the node 100A. The DRAM 120A can be configured to buffer data (e.g. data to be written into the SSD group 12A), and the C2F SSD 122A can be configured to copy buffered data in the DRAM 120A to a Flash memory within the C2F SSD 122A, to prevent data loss of the buffered data when there is a need. For example, the C2F SSD 122A can be implemented by way of an expansion card mounted on a main circuit board (e.g. main board or motherboard) within the node 100A, such as an M.2 module (e.g. a circuit board having a connector conforming to M.2 specification), where the C2F SSD 122A may comprise a memory controller, one or more Flash memory chips, etc., but the present invention is not limited thereto. In addition, the network interface module 130A comprising the network interface circuits 132A and 134A can be configured to couple the node 100A (e.g. the processor 110A, the DRAM 120A, etc. on the main circuit board therein) to at least one network (e.g. Local Area Network (LAN), Wide Area Network (WAN), Internet, etc.) through at least one network switch such as top-of-rack (TOR) switches 10A and 10B. Additionally, the storage interface module 160A comprising the storage interface circuits 162A and 164A can be configured to couple the node 100A (e.g. the processor 110A, the DRAM 120A, etc. on the main circuit board therein) to multiple Flash storage devices such as the SSD groups 12A and 12B shared by the nodes 100A and 100B, for accessing (e.g. reading or writing) data in the multiple Flash storage devices. As a result, the AFA server 100 can be configured to provide a storage service to users through the node 100A.

Similarly, the processor 110B running program modules 112B can be configured to control operations of the node 100B. The DRAM 120B can be configured to buffer data (e.g. data to be written into the SSD group 12B), and the C2F SSD 122B can be configured to copy buffered data in the DRAM 120B to a Flash memory within the C2F SSD 122B, to prevent data loss of the buffered data when there is a need. For example, the C2F SSD 122B can be implemented by way of an expansion card mounted on a main circuit board (e.g. main board or motherboard) within the node 100B, such as an M.2 module (e.g. a circuit board having a connector conforming to M.2 specification), where the C2F SSD 122B may comprise a memory controller, one or more Flash memory chips, etc., but the present invention is not limited thereto. In addition, the network interface module 130B comprising the network interface circuits 132B and 134B can be configured to couple the node 100B (e.g. the processor 110B, the DRAM 120B, etc. on the main circuit board therein) to at least one network (e.g. LAN, WAN, Internet, etc.) through at least one network switch such as the top-of-rack (TOR) switches 10A and 10B. Additionally, the storage interface module 160B comprising the storage interface circuits 162B and 164B can be configured to couple the node 100B (e.g. the processor 110B, the DRAM 120B, etc. on the main circuit board therein) to multiple Flash storage devices such as the SSD groups 12A and 12B shared by the nodes 100A and 100B, for accessing (e.g. reading or writing) data in the multiple Flash storage devices. As a result, the AFA server 100 can be configured to provide the storage service to the users through the node 100B.

Regarding communications between the node 100A and its peer node such as the node 100B, the NTB module such as the NTB communications circuit 140A can be configured to communicate with a corresponding NTB module such as the NTB communications circuit 140B through a NTB path (labeled "NTB" for brevity) between the nodes 100A and 100B, to synchronize data and storage statuses of the nodes 100A and 100B and make them identical. Similarly, regarding communications between the node 100B and its peer node such as the node 100A, the NTB module such as the NTB communications circuit 140B can be configured to communicate with a corresponding NTB module such as the NTB communications circuit 140A through the NTB path between the nodes 100A and 100B, to synchronize data and storage statuses of the nodes 100A and 100B and make them identical. More particularly, the NTB modules such as the NTB communications circuit 140A and 140B can provide a function of a transport bridge between the nodes 100A and 100B and separate respective addresses domains of the nodes 100A and 100B, for facilitating communications between the nodes 100A and 100B without any address confliction. For example, the respective buses of the nodes 100A and 100B may conform to Peripheral Component Interconnect Express (PCIe) specification, and the NTB module of each node of the nodes 100A and 100B may be regarded as an endpoint of the node, where the nodes 100A and 100B may communicate and share devices with each other through the transport bridge, but the present invention is not limited thereto. According to some embodiments, the NTB modules such as the NTB communications circuit 140A and 140B can be implemented by way of a customized network interface circuit, for controlling the nodes 100A and 100B to communicate with each other as if they are communicating through network interface circuits.

Under control of the processor 110A running program modules 112A and the processor 110B running program modules 112B, the nodes 100A and 100B can maintain and monitor heartbeats over the NTB to determine peer node availability, for performing high availability (HA) control. For example, the node 100B can be configured to send a heartbeat signal to the node 100A, and the node 100A can be configured to detect and monitor the heartbeat signal from the node 100B to determine the availability of the node 100B, where whether the heartbeat signal from the node 100B exists may indicate whether the node 100B is available (or healthy). For another example, the node 100A can be configured to send a heartbeat signal to the node 100B, and the node 100B can be configured to detect and monitor the heartbeat signal from the node 100A to determine the availability of the node 100A, where whether the heartbeat signal from the node 100A exists may indicate whether the node 100A is available (or healthy). Based on the architecture shown in FIG. 1, when one of the nodes 100A and 100B is unavailable, the other of the nodes 100A and 100B can continue provide the storage service of the AFA server 100 for the users.

Please note that the AFA server 100 is equipped with more than one inter-node communications path. In addition to the NTB path, the AFA server 100 can be configured to have one or more additional communications paths such as a BMC path between the BMCs 150A and 150B, where the BMC 150A can be configured to manage at least one portion (e.g. a portion or all) of the hardware layer of the node 100A, and the BMC 150B can be configured to manage at least one portion (e.g. a portion or all) of the hardware layer of the node 100B. Regarding communications between the node 100A and its peer node such as the node 100B, the BMC 150A can be configured to communicate with the BMC 150B through the BMC path to access (e.g. read or write) one or more register values of one or more registers in the register circuit 152B, for performing status check, etc. on the node 100B. Similarly, regarding communications between the node 100B and its peer node such as the node 100A, the BMC 150B can be configured to communicate with the BMC 150A through the BMC path to access (e.g. read or write) one or more register values of one or more registers in the register circuit 152A, for performing status check, etc. on the node 100A. More particularly, the BMCs 150A and 150B can manage the respective hardware layer of the nodes 100A and 100B independently, having no need to rely on the processors 110A and 110B. For example, the BMC 150A can take care of unfinished works of the node 100A when the processor 110A malfunctions, and the BMC 150B can take care of unfinished works of the node 100B when the processor 110B malfunctions, but the present invention is not limited thereto. According to some embodiments, the BMCs 150A and 150B can be configured to take over the nodes 100A and 100B, respectively, to perform emergency processing to reduce the probability of data loss.

According to this embodiment, the AFA server 100 can be configured to be powered by multiple types of power sources. Each node of the nodes 100A and 100B may comprise at least one main power source (e.g. at least one power supply), for providing power to other components of the node in a normal power condition of the main power source. For example, the main power source of the node 100A can provide power to the main circuit board of the node 100A, and the main power source of the node 100B can provide power to the main circuit board of the node 100B. When an abnormal power condition of one or more nodes (e.g. the node 100A and/or the node 100B) is detected, one or more associated backup power sources (e.g. the backup power unit 170A and/or the backup power unit 170B) in the AFA server 100 can be configured to provide backup power. For example, the backup power unit 170A can provide power to the main circuit board of the node 100A (e.g. the processor 110A, the DRAM 120A, the C2F SSD 122A, the NTB communications circuit 140A, the BMC 150A, the register circuit 152A, etc.) when power failure of the main power source of the node 100A occurs, and the backup power unit 170B can provide power to the main circuit board of the node 100B (e.g. the processor 110B, the DRAM 120B, the C2F SSD 122B, the NTB communications circuit 140B, the BMC 150B, the register circuit 152B, etc.) when power failure of the main power source of the node 100B occurs.

According to some embodiments, each node of the nodes 100A and 100B (e.g. each of the respective main circuit boards of the nodes 100A and 100B) may further comprise sensors/detectors configured to perform detection on at least the components of the node to generate detection results (e.g. status obtained from any of the sensors/detectors). For example, a power detection result of the detection results may represent the power status of the main power source of the node, and more particularly, may indicate whether the abnormal power condition of the node occurs, for triggering the node to activate the backup power source (e.g. the backup power unit 170A or the backup power unit 170B) to provide the backup power.

Figure 2:
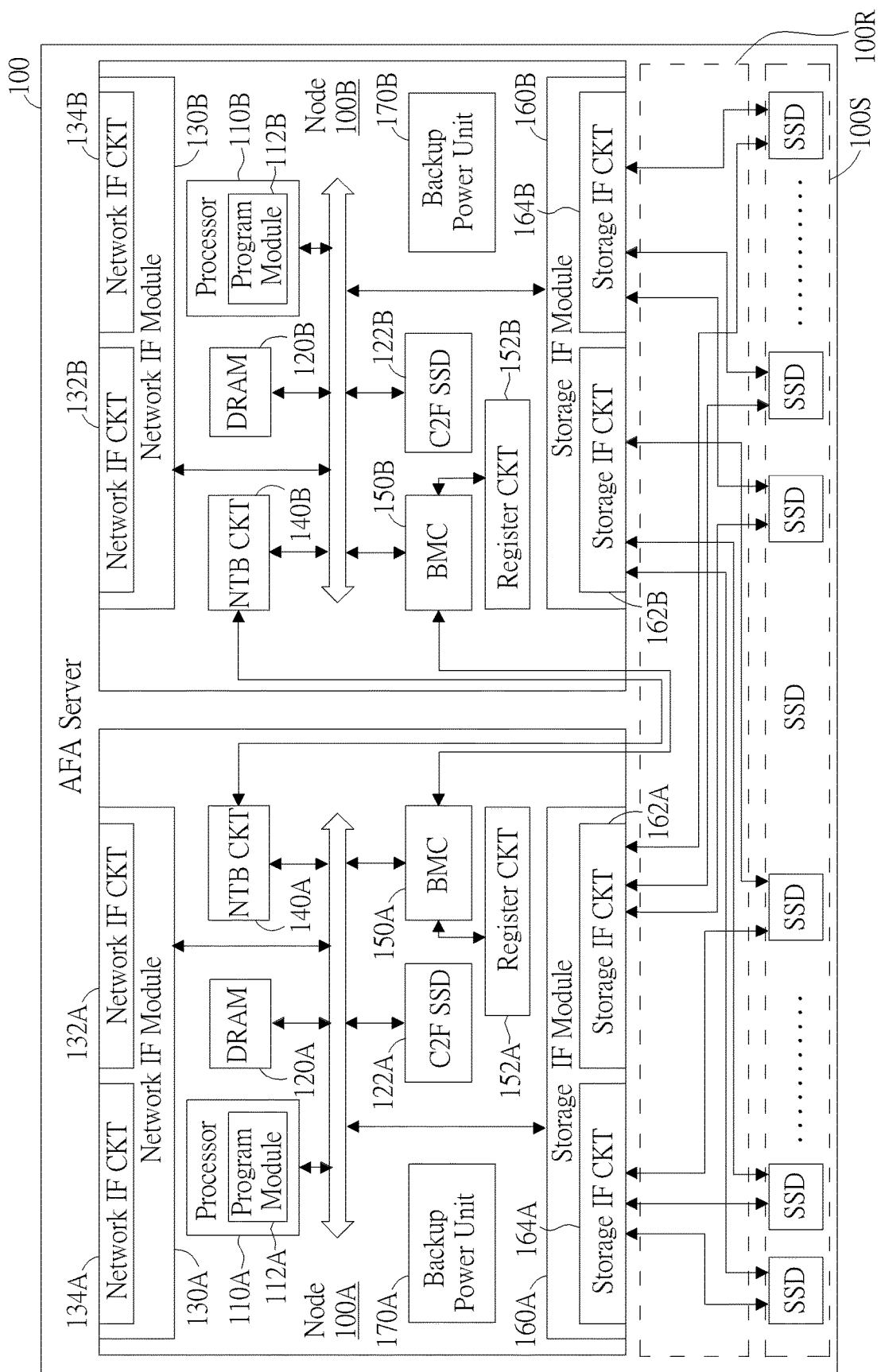
FIG. 2 illustrates some implementation details of the AFA server shown in FIG. 1 according to an embodiment of the present invention.

FIG. 2 illustrates some implementation details of the AFA server 100 shown in FIG. 1 according to an embodiment of the present invention, where the SSDs 100S can be taken as an example of the multiple SSDs mentioned in the embodiment shown in FIG. 1. In addition to the nodes 100A and 100B and the SSDs 100S, the AFA server 100 may further comprise a backplane circuit 100R. The backplane circuit 100R can be configured to electrically connect the SSDs 100S such as the SSD groups 12A and 12B to the nodes 100A and 100B. For example, the backplane circuit 100R can be implemented by way of a backplane circuit board having associated connectors, etc. In addition, a partial path of the NTB path between the NTB communications circuits 140A and 140B and a partial path of the BMC path between the BMCs 150A and 150B can be implemented within the backplane circuit 100R. As each of the NTB path and the BMC path does not pass through any cable which may be easily damaged, the communications paths between the nodes 100A and 100B are robust, and therefore, the nodes 100A and 100B can maintain effective communications and associated control to guarantee overall performance of the AFA server 100.

According to some embodiments, each of the SSDs 100S can be a single port SSD, and more particularly, can be a single port device based SSD. In addition, with aid of the backplane circuit 100R, the AFA server 100 can support hot-plug of any of the SSDs 100S.

According to some embodiments, one of the two nodes 100A and 100B may play a role of an active node in a high availability (HA) architecture of the AFA server 100, and another of the two nodes 100A and 100B may play a role of a standby node in the HA architecture of the AFA server 100. The two nodes 100A and 100B such as the active node and the standby node may interact with each other, and more particularly, may exchange node information through at least two communications paths such as the NTB path between the NTB communications circuits 140A and 140B and the BMC path between the BMCs 150A and 150B, and may synchronize data through the NTB path, but the present invention is not limited thereto. According to some embodiments, the AFA server 100 can be equipped with more than two inter-node communications paths.

Figure 3:
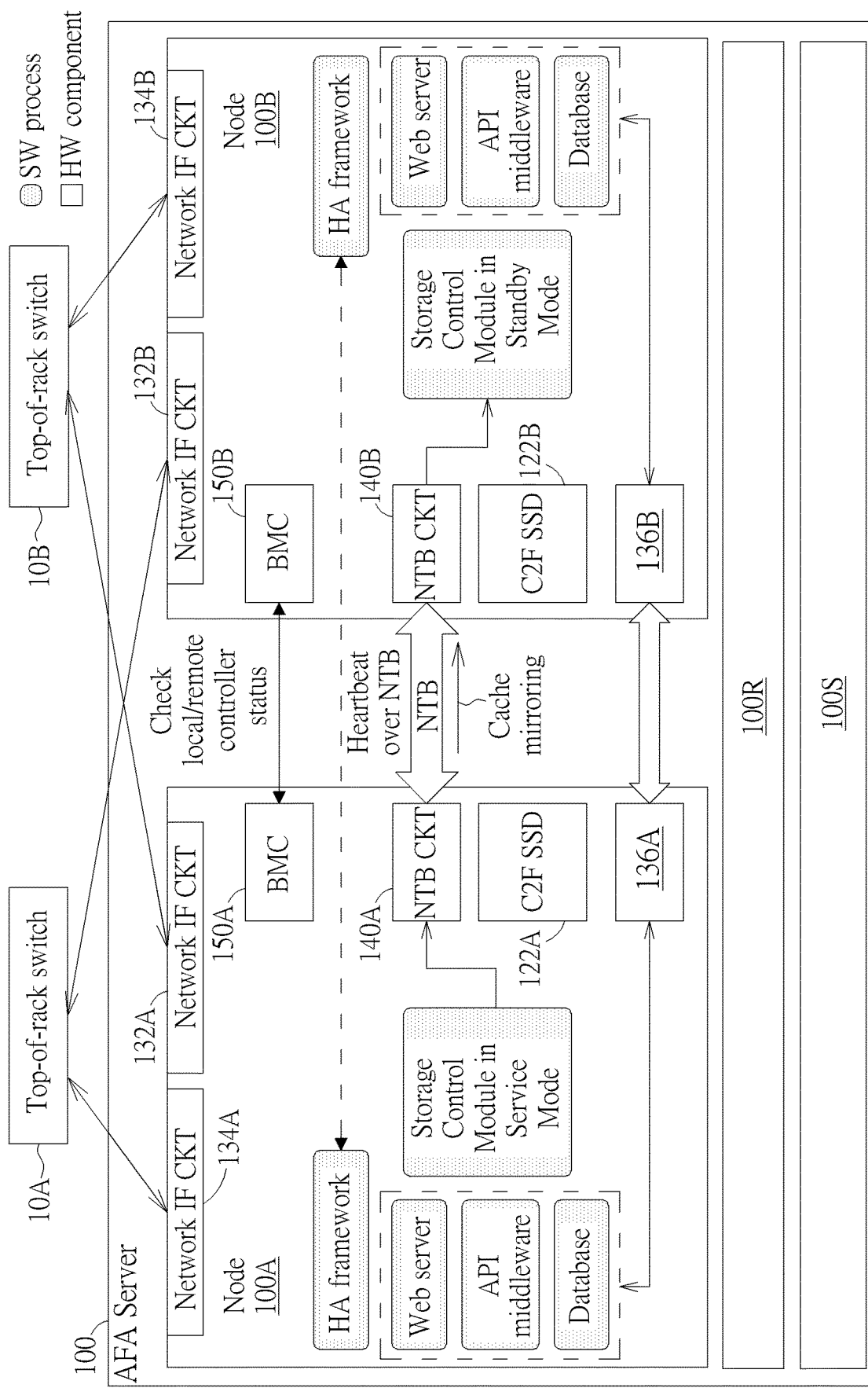
FIG. 3 illustrates a dual node architecture of the AFA server shown in FIG. 1 according to an embodiment of the present invention.

FIG. 3 illustrates a dual node architecture of the AFA server 100 shown in FIG. 1 according to an embodiment of the present invention. According to this embodiment, the nodes 100A and 100B can be configured to play the role of the active node and the role of the standby node, respectively, but the present invention is not limited thereto. For example, the nodes 100A and 100B can exchange their roles when there is a need. As shown in FIG. 3, in addition to some hardware (HW) components such as a portion of the components in the architecture shown in FIG. 1 or FIG. 2, some software (SW) processes such as HA framework processes, Web server processes, Database processes, a Storage Control Module process operating in a Service Mode and a Storage Control Module process operating in a Standby Mode (respectively labeled "HA framework", "Web server", "Database", "Storage Control Module in Service Mode" and "Storage Control Module in Standby Mode" for brevity) may be illustrated to indicate the associated interactions in the AFA server 100. The names of the processes described above indicate the associated functions thereof, respectively.

The software processes running on the node 100A (e.g. the HA framework process, the Web server process, the Database process, and the Storage Control Module process operating in the Service Mode) can be taken as examples of the program modules 112A, and the software processes running on the node 100B (e.g. the HA framework process, the Web server process, the Database process, and the Storage Control Module process operating in the Standby Mode) can be taken as examples of the program modules 112B, but the present invention is not limited thereto. In addition, the one or more network interface circuits of the network interface module 130A may further comprise a network interface circuit 136A, and the one or more network interface circuits of the network interface module 130B may further comprise a network interface circuit 136B. Thus, the AFA server 100 can be equipped with at least three inter-node communications paths such as the NTB path, the BMC path, and the network path between the network interface circuits 136A and 136B. For example, the nodes 100A and 100B can be configured to perform cache mirroring through the NTB path, check local/remote controller statuses through the BMC path, and perform additional communications operations through the network path between the network interface circuits 136A and 136B.

Figure 4:
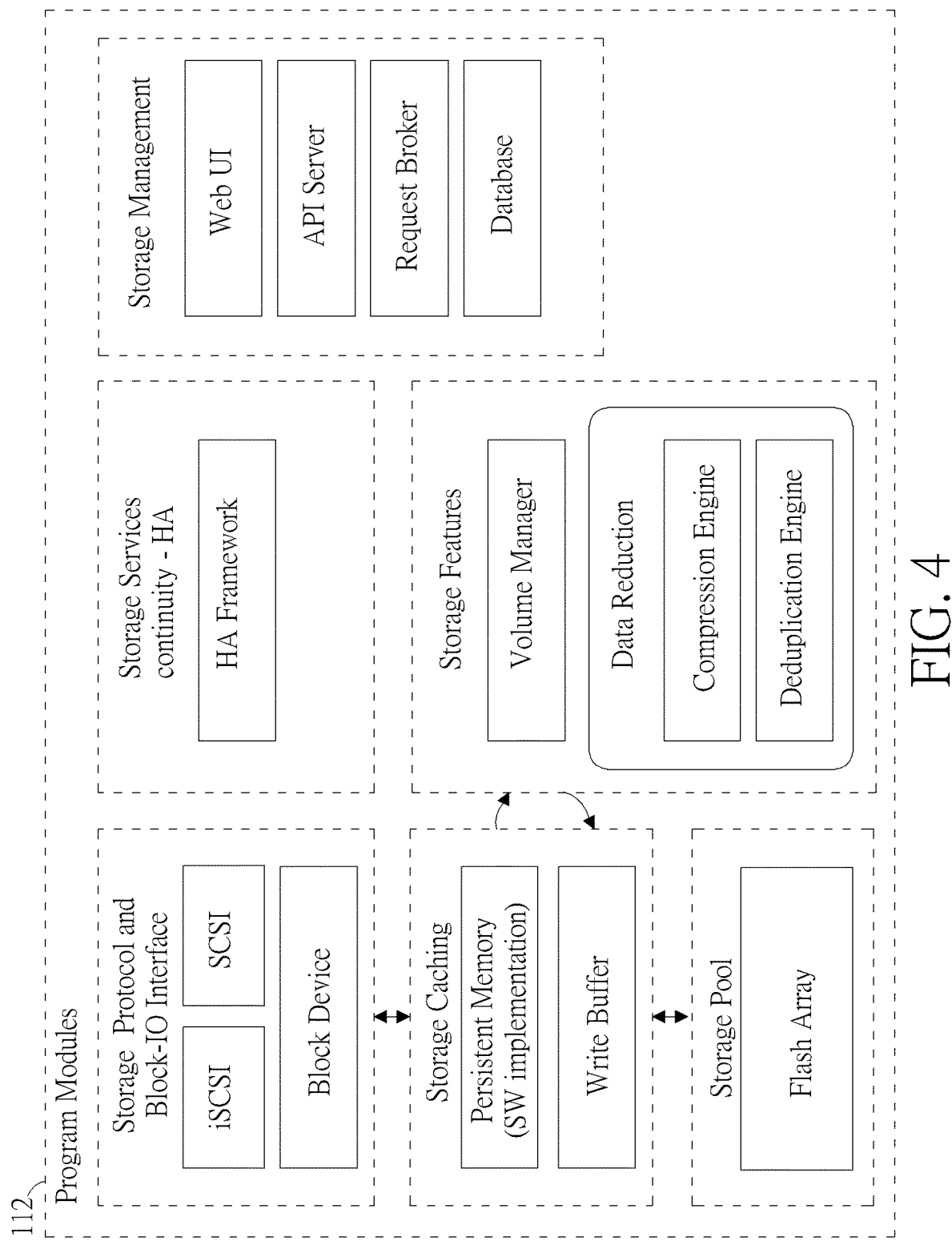
FIG. 4 illustrates some program modules in any of the nodes shown in FIG. 1 according to an embodiment of the present invention.

FIG. 4 illustrates some program modules 112 in any (e.g. each) of the nodes 100A and 100B shown in FIG. 1 according to an embodiment of the present invention. For example, the program modules 112 may represent the program modules 112A running on the processor 110A of the node 100A or the program modules 112B running on the processor 110B of the node 100B. As shown in FIG. 4, the program modules 112 may comprise some primary program modules such as a Storage Protocol and Block-Input/Output (IO) Interface module, a Storage Caching module, a Storage Pool module, a Storage Services continuity—HA module, a Storage Features module and a Storage Management module (respectively labeled "Storage Protocol and Block-IO Interface", "Storage Caching", "Storage Pool", "Storage Services continuity—HA", "Storage Features" and "Storage Management" for brevity), where any of the primary program modules may comprise one or more sub-modules. In addition, the arrows between some of the program modules 112 indicate that they can interact with each other among multiple layers of program modules. For example, the Storage Protocol and Block-IO Interface module can be regarded as an upper layer (e.g. an upper layer program module) above the Storage Caching module, the Storage Pool module can be regarded as a lower layer (e.g. a lower layer program module) below the Storage Caching module, and the Storage Features module and the Storage Caching module can be arranged in an intermediate layer to be intermediate layer program modules, where the Storage Protocol and Block-TO Interface module and the Storage Pool module can be configured to interact with the client device and the SSD group, but the present invention is not limited thereto. When there is a need, the node can trigger other program modules to interact with one or more of these program modules.

The Storage Protocol and Block-TO Interface module may comprise some sub-modules such as a Small Computer System Interface (SCSI) module, an Internet SCSI (iSCSI) module and a Block Device module (respectively labeled "SCSI", "iSCSI" and "Block Device" for brevity). The Storage Caching module may comprise some sub-modules such as a Persistent Memory using SW implementation module and a Write Buffer module (respectively labeled "Persistent Memory (SW implementation)" and "Write Buffer" for brevity). The Storage Pool module may comprise a sub-module such as a Flash Array module (labeled "Flash Array for brevity). The Storage Services continuity—HA module may comprise a sub-module such as a HA Framework module (labeled "HA Framework" for brevity). The Storage Features module may comprise some sub-modules such as a Volume Manager module and a Data Reduction module (respectively labeled "Volume Manager" and "Data Reduction" for brevity), where the Data Reduction module may comprise some sub-modules such as a Compression Engine module and a Deduplication Engine module, which may be respectively referred to as the Compression Engine and the Deduplication Engine. The Storage Management module may comprise some sub-modules such as a Web User Interface (UT) module, an Application Programming Interface (API) Server module, a Request Broker module and a Database module (respectively labeled "Web UT", "API Server", "Request Broker" and "Database" for brevity). The names of the modules described above indicate the associated functions thereof, respectively.

According to some embodiments, the AFA server 100 (e.g. the active node, such as one of the nodes 100A and 100B) can be configured to receive requests such as a write request, a read request, etc. from a client device outside the AFA server 100, and operate in response to the requests, respectively.

Figure 5:
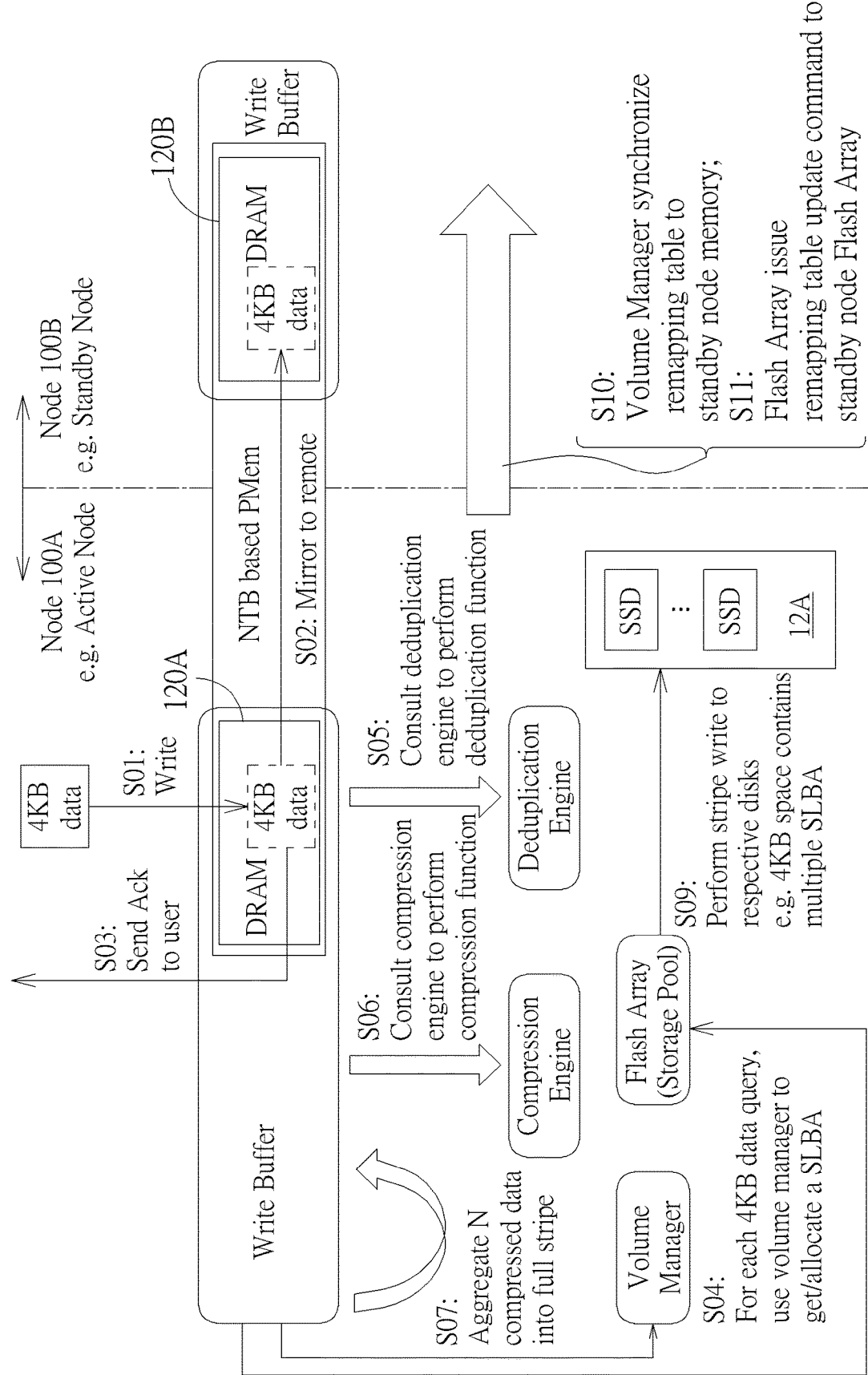
FIG. 5 illustrates a write control scheme of a method for performing node information exchange management of an AFA server such as that shown in FIG. 1 according to an embodiment of the present invention.

FIG. 5 illustrates a write control scheme of a method for performing node information exchange management of an AFA server such as that shown in FIG. 1 according to an embodiment of the present invention. The method can be applied to the AFA server 100 shown in FIG. 1. For better comprehension, the nodes 100A and 100B can play the role of the active node and the role of the standby node, respectively, but the present invention is not limited thereto. In response to the write request, the active node (e.g. one of the nodes 100A and 100B, such as the node 100A in this embodiment) can utilize the Write Buffer module to receive data (e.g. 4 kilobytes (KB) data, referred to as 4 KB data for brevity) corresponding to the write request and write (e.g. buffer) the data into the write buffer thereof (e.g. the DRAM of this node) in Step S01, mirror the data such as the 4 KB data to the standby node (e.g. another of the nodes 100A and 100B, such as the node 100B in this embodiment) through the NTB path in Step S02, and send an acknowledgement (Ack) corresponding to the write request to the client device of the user in Step S03. As the data has been mirrored to the remote side (e.g. the DRAM 120B in this embodiment), the mirrored data is protected by the standby node (e.g. the Write Buffer module thereof).

Regarding subsequent operations of the active node, in Step S04, for each 4 KB data query, the Write Buffer module can use the Volume Manager module to get or allocate a storage pool logical block address (SLBA) for the data. In Step S05, the Write Buffer module can consult the Deduplication Engine to perform a deduplication function on the data. In Step S06, the Write Buffer module can consult the Compression Engine to perform a compression function on the data. In Step S07, when a data amount of buffered data (e.g. the data to be written) in the DRAM (e.g. the DRAM 120A in this embodiment) reaches a predetermined threshold, for example, the active node has collected N sets of compressed data and the total data amount of the N sets of compressed data is suitable for being stored as a full stripe, the active node can utilize the Flash Array module to aggregate the N sets of compressed data (which can be referred to as N compressed data for brevity) into the full stripe. For example, the full stripe may represent a stripe comprising a predetermined number of chunks (e.g. twelve chunks), where these chunks may comprise a first predetermined number of data chunks (e.g. ten data chunks) and a second predetermined number of parity chunks (e.g. two parity chunks). In Step S08, after collecting one or more stripes such as a predetermined amount of stripes (e.g. any of one stripe, two stripes, three stripes, four stripes, etc., depending on various control schemes of the method), the active node can utilize the Write Buffer module to submit array information such as an array of SLBAs, an array of compressed data, etc. (e.g. the array of {Array of SLBAs, Array of compressed data}) to the Flash Array module (or the Storage Pool module), for writing the one or more stripes. In Step S09, the Flash Array module can perform stripe write to respective disks (e.g. the SSD group of the active node, such as the SSD group 12A in this embodiment). For example, as the Compression Engine has performed the compression function in Step S06, 4 KB space contains respective compressed data of multiple SLBA.

After performing the operations of Step S01-S09 as shown in FIG. 5, the active node can transmit associated management information to the standby node to update the management information in the standby node, in order to make the standby node be capable of replacing the active node to continue providing the storage service of the AFA server 100 for the users when there is a need. For example, in Step S10, the Volume Manager module of the active node can synchronize (e.g. update and transmit) a remapping table of the Volume Manager module to the standby node memory (e.g. the memory of the standby node), for controlling (e.g. generating, updating, etc.) some mapping relationships managed by the Volume Manager module. In Step S11, the Flash Array module of the active node can issue a remapping table update command to the standby node Flash Array (e.g. the Flash Array module of the standby node), to update a remapping table of the Flash Array module to the standby node memory (e.g. the memory of the standby node), for controlling (e.g. generating, updating, etc.) some mapping relationships managed by the Flash Array module. While the active node is capable of performing these operations in response to the write request as described above, the active node is capable of performing associated operations in response to the read request to recover the data, for example, according to the mapping relationships respectively managed by the Volume Manager module and the Flash Array module, where some implementation details regarding managing these mapping relationships will be described in some of the subsequent embodiments.

As shown in the upper half of FIG. 5, with the aid of software emulation, any node (e.g. each node) of the nodes 100A and 100B may comprise an emulated persistent memory (which may be referred to as PMem for brevity) based on another node of the multiple nodes, where the PMem can operate on the NTB path, and therefore can be regarded as the NTB based PMem. For example, the any node such as the node 100A can play the role of the active node and the other node such as the node 100B can play the role of the standby node. When a power failure of the main power source of the active node (e.g. the power failure of both of the respective main power sources of the nodes 100A and 100B) occurs, the active node can flush existing information (e.g. buffered data, management table, etc.) in the DRAM thereof into both of an internal non-volatile memory (NVM) storage device (e.g. the C2F SSD of the active node, such as the C2F SSD 122A in this embodiment) and the PMem. More particularly, as each of the nodes is equipped with its own internal NVM storage device(s) and PMem, the standby node can flush the existing information flushed from the active node (e.g. the buffered data, the management table, etc. flushed from the active node) in the DRAM thereof into an internal NVM storage device (e.g. the C2F SSD of the standby node, such as the C2F SSD 122B in this embodiment).

For the active node, although the DRAMs 120A and 120B in the NTB based PMem are volatile memories, the AFA server 100 can utilize the NTB based PMem as a persistent memory with the aid of software emulation, since the standby node that is operating under control of the Write Buffer module thereof can protect any existing information flushed from the active node. When the power failure occurs, the active node can flush the existing information in the DRAM thereof into the internal NVM storage device such as one of multiple NVM storage devices conforming to M.2 specification, and can flush the existing information in the DRAM thereof into the PMem by sending the existing information to the DRAM of the standby node through the NTB path. As a result, the standby node can flush the existing information in the DRAM thereof into the internal NVM storage device thereof (e.g. one of multiple NVM storage devices conforming to M.2 specification).

According to some embodiments, the nodes 100A and 100B can exchange the roles of the active node and the standby node, and can perform the respective operations of the nodes 100B and 100A as described above. For brevity, similar descriptions for these embodiments are not repeated in detail here.

According to some embodiments, in the high availability (HA) architecture implemented with the AFA server 100, the two nodes 100A and 100B such as the active node and the standby node may interact with each other to exchange the node information through the BMC path and the NTB path. More particularly, any node (e.g. each node) of the two nodes 100A and 100B may comprise one or more storage devices installed at the main circuit (e.g. the main circuit board having some hardware (HW) components thereon, as mentioned in the embodiment shown in FIG. 1 and some associated embodiments), such as one or more non-volatile memory (NVM) storage devices comprising NVM (e.g. Flash memory). In a situation where the NVM storage device count of the one or more NVM storage devices is greater than one, the one or more NVM storage devices may comprise multiple NVM storage devices such as that mentioned above. For example, the one or more NVM storage devices may conform to M.2 specification and may be implemented as one or more internally mounted expansion cards of this node, but the present invention is not limited thereto. In addition, when power failure occurs, one or more lower layers such as the SSDs in the AFA of the node may become unavailable, the main circuit of the node, as well as the HW components (e.g. the processor, the DRAM, the BMC, the registers, etc.) of this main circuit, may operate using power of the backup power source (e.g. the battery) of the main circuit, and the node (e.g. software modules running on the processor, such as the program modules 112A or 112B) may perform a C2F operation to save any information to be protected, such as buffered data, etc. temporarily stored in the DRAM of the node and the node information, etc. temporarily stored in the registers of the register circuit of the node, into the one or more NVM storage devices to prevent data loss. For example, the C2F SSD of the node may comprise the one or more NVM storage devices conforming to the M.2 specification.

Figure 6:
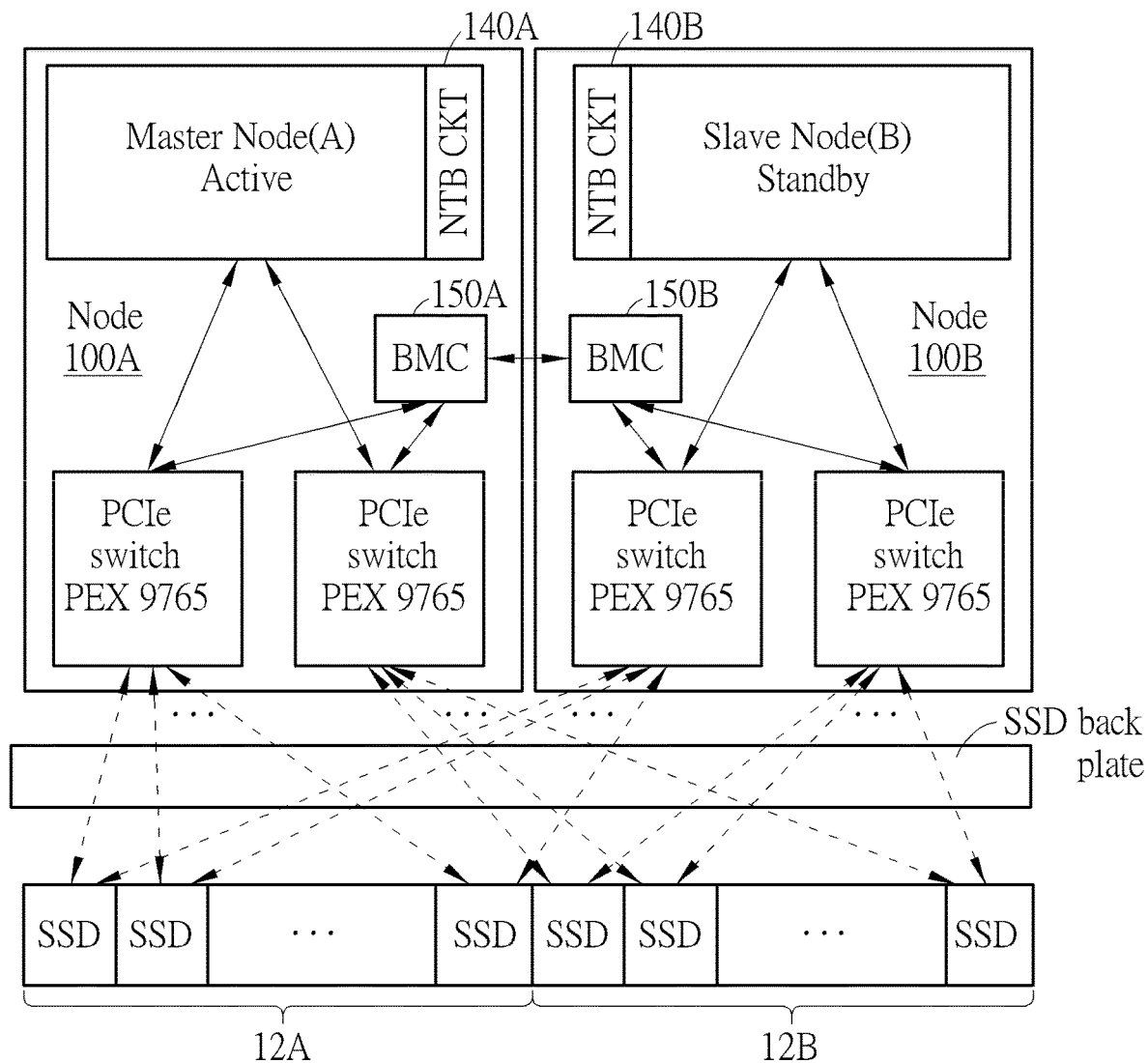
FIG. 6 illustrates a disk switching control scheme of the method for performing node information exchange management of the AFA server according to an embodiment of the present invention.

FIG. 6 illustrates a disk switching control scheme of the method for performing node information exchange management of the AFA server according to an embodiment of the present invention. According to this embodiment, the two nodes 100A and 100B may be regarded as a master node and a slave node, respectively, where the master node may represent the node that is closer to the power supply of the AFA server 100 among the two nodes 100A and 100B, and the slave node may represent the other of the two nodes 100A and 100B. For example, the master node and the slave node may respectively play the roles of the active node and the standby node by default. As shown in FIG. 6, the storage interface circuits 162A and 164A of the node 100A and the storage interface circuits 162B and 164B of the node 100B can be implemented with PCIe switch circuits named PEX 9765 (labeled "PCIe switch PEX 9765" for brevity), and the backplane circuit 100R can be implemented to be the SSD back plate in this embodiment. Any of these PCIe switch circuits may also be referred to as 9765 for brevity.

In any node (e.g. each node) of the two nodes 100A and 100B, the processor running the program modules (e.g. one of the blocks respectively labeled "Master Node(A) Active" and "Slave Node(B) Standby") may control the AFA through one or more switch circuits (e.g. one or more of these PCIe switch circuits) and a connection circuit (e.g. the SSD back plate), and the BMC may control the AFA by itself through the one or more switch circuits and the connection circuit. For better comprehension, the AFA may represent the array of SSDs of a certain SSD group among the SSD groups 12A and 12B under control of the AFA system (e.g. AFA software/program module such as the Storage Control Module of the corresponding node of the two nodes 100A and 100B shown in FIG. 3). For example, in the node 100A, the processor 110A running the program modules 112A (e.g. "Master Node(A) Active") may control the AFA through one or more PCIe switch circuits thereof and the SSD back plate. For another example, in the node 100B, the processor 110B running the program modules 112B (e.g. "Slave Node(B) Standby") may control the AFA through one or more PCIe switch circuits thereof and the SSD back plate.

According to some embodiments, the BMC of the any node (e.g. each node) of the two nodes 100A and 100B may operate under control of the software layer (e.g. the software modules such as connector, HW/board manager, etc.), to access any of the registers (e.g. read or write node information) when there is a need. For example, role and status transitions may be illustrated with a transition diagram, where status may be synchronized through the BMC path, and the data and status may be synchronized through the NTB path. The node information may comprise monitored information (e.g. status), and the node may classify the monitored information into multiple types to perform operations corresponding to the multiple types (e.g. output warning for Type A, perform C2F operation for Type B, trigger failover for Type C, set standalone for Type D, etc.), respectively. For example, the monitored information (e.g. status) may comprise status detected via the sensors/detectors in the node (e.g. in the main circuit). For better comprehension, some terms such as UI, DB, SMIStor, PSU, Pmem, FA, and SDR may stand for User Interface (e.g. UI software/program module such as the Web UI module shown in the upper right of FIG. 4), Database (e.g. DB software/program module such as the Database module shown in the upper right of FIG. 4), AFA system (e.g. AFA software/program module such as the Storage Control Module of the corresponding node of the nodes 100A and 100B shown in FIG. 3), Power Supply Unit (e.g. the aforementioned at least one main power source of the embodiment shown in FIG. 1), Persistent memory (e.g. Pmem software/program module such as the Persistent Memory shown in the middle of the left-hand side of FIG. 4, the NTB based PMem shown in the upper half of FIG. 5, etc.), Flash Array (e.g. FA software/program module such as the Flash Array module shown in the lower left of FIG. 4), and Sensor Data Record (e.g. one or more records of sensor data obtained from the sensors/detectors in the node), respectively. For example, the DB may record user action information (e.g. historical information of user actions) to be used by the UI. In addition, some software components such as resources may comprise the HW manager, etc. In the actions of the resources, the action "demote" may release or give up the role of the active node, and the action "promote" may change the role of the node from standby (e.g. the standby node) to active (e.g. the active node).

Figure 7:
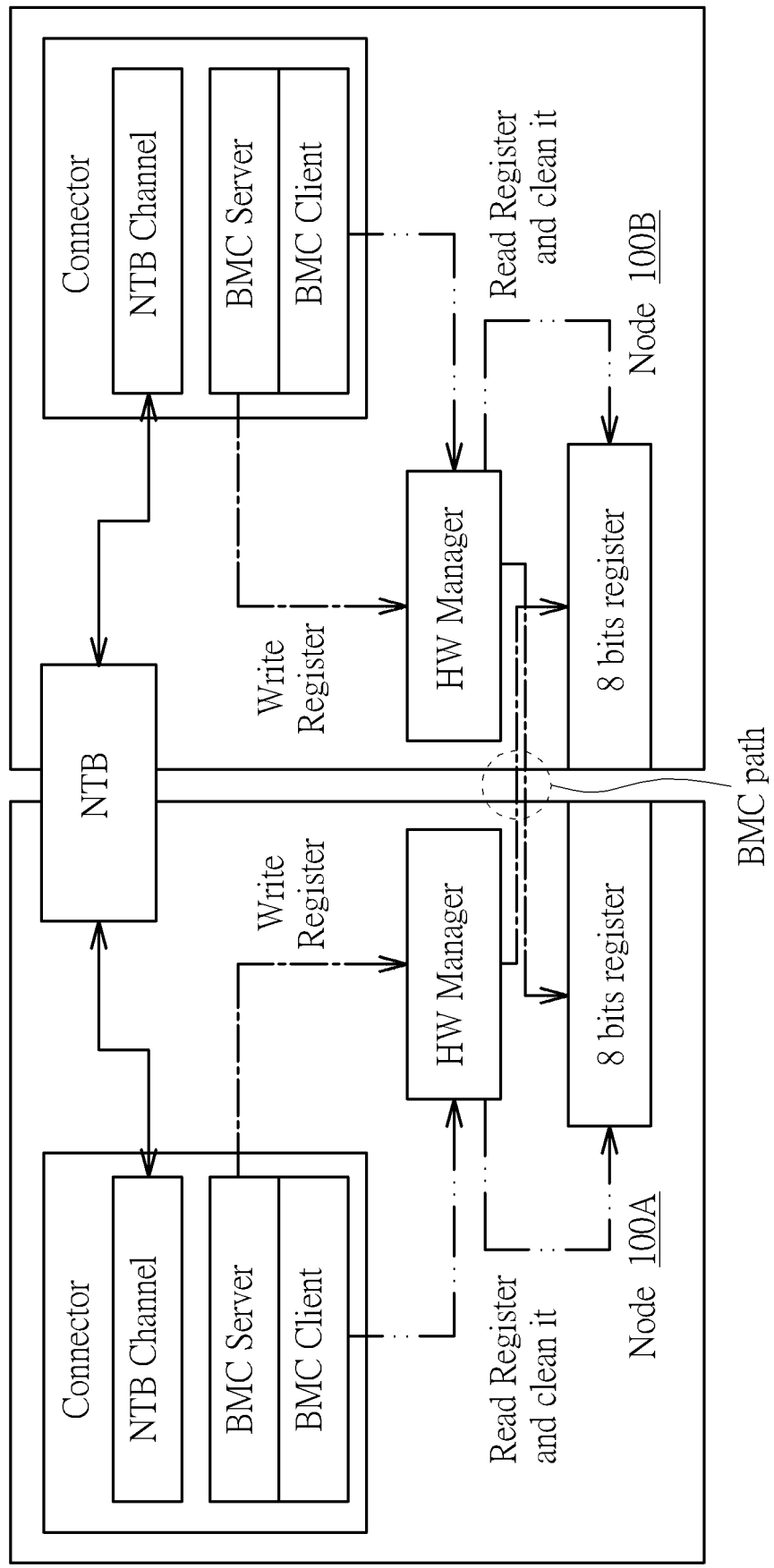
FIG. 7 illustrates a role information exchange control scheme of the method for performing node information exchange management of the AFA server according to an embodiment of the present invention.

FIG. 7 illustrates a role information exchange control scheme of the method for performing node information exchange management of the AFA server according to an embodiment of the present invention. Under control of the software layer (e.g. the software modules, such as the HA Framework module, etc.), the any node (e.g. each node) of the two nodes 100A and 100B can be configured to exchange the role information according to the role information exchange control scheme. For example, the two nodes 100A and 100B can exchange the role information through the aforementioned at least two communications paths such as the NTB path (labeled "NTB" in FIG. 1 and FIG. 7 for brevity) between the NTB communications circuits 140A and 140B shown in FIG. 1 and the BMC path between the BMCs 150A and 150B shown in FIG. 1, where some HW components such as the NTB communications circuits 140A and 140B and the BMCs 150A and 150B are not illustrated in FIG. 7 for brevity.

As shown in FIG. 7, the program modules 112A running on the processor 110A of the node 100A may comprise a Connector module (labeled "Connector" for brevity) for controlling a portion of operations regarding connections between the two nodes 100A and 100B, and the program modules 112B running on the processor 110B of the node 100B may comprise a Connector module (labeled "Connector" for brevity) for controlling another portion of operations regarding the connections between the two nodes 100A and 100B, where each of the respective Connector modules of the two nodes 100A and 100B may comprise multiple sub-modules such as a NTB Channel module, a BMC Server module and a BMC Client module (labeled "NTB Channel", "BMC Server" and "BMC Client" for brevity). For example, the Connector module of the node 100A may control the NTB communications circuit 140A to communicate with the NTB communications circuit 140B through the NTB path, and the Connector module of the node 100B may control the NTB communications circuit 140B to communicate with the NTB communications circuit 140A through the NTB path, as illustrated with some role information exchange paths corresponding to the NTB path (e.g. the role information exchange path between the NTB Channel module of the node 100A and the NTB path and the role information exchange path between the NTB Channel module of the node 100B and the NTB path. As a result, the two nodes 100A and 100B can be configured to exchange the role information (e.g. information indicating the role of the node 100A and information indicating the role of the node 100B) through the NTB path.

The program modules 112A running on the processor 110A of the node 100A may further comprise another program module such as the HW Manager module thereof (labeled "HW Manager" in the node 100A shown in FIG. 7 for brevity) for controlling some HW components such as the BMC 150A, the register circuit 152A, etc. in the node 100A, and the program modules 112B running on the processor 110B of the node 100B may further comprise another program module such as the HW Manager module thereof (labeled "HW Manager" in the node 100B shown in FIG. 7 for brevity) for controlling some HW components such as the BMC 150B, the register circuit 152B, etc. in the node 100B. For example, the BMC Server module of the node 100A may control the BMC 150A through the HW Manager module of the node 100A, to write at least one register (e.g. 8 bits register) of the register circuit 152B of the node 100B, as illustrated with some role information exchange paths regarding register writing (e.g. the role information exchange path between the BMC Server module and the HW Manager module of the node 100A and the role information exchange path between the HW Manager module of the node 100A and the 8 bits register of the node 100B). Similarly, the BMC Server module of the node 100B may control the BMC 150B through the HW Manager module of the node 100B, to write at least one register (e.g. 8 bits register) of the register circuit 152A of the node 100A, as illustrated with some role information exchange paths regarding register writing (e.g. the role information exchange path between the BMC Server module and the HW Manager module of the node 100B and the role information exchange path between the HW Manager module of the node 100B and the 8 bits register of the node 100A). In addition, the BMC Client module of the node 100A may control the BMC 150A through the HW Manager module of the node 100A, to read the aforementioned at least one register (e.g. the 8 bits register) of the register circuit 152A of the node 100A, and more particularly, clean it when there is a need, as illustrated with some role information exchange paths regarding register reading and cleaning (e.g. the role information exchange path between the BMC Client module and the HW Manager module of the node 100A and the role information exchange path between the HW Manager module and the 8 bits register of the node 100A). Similarly, the BMC Client module of the node 100B may control the BMC 150B through the HW Manager module of the node 100B, to read the aforementioned at least one register (e.g. the 8 bits register) of the register circuit 152B of the node 100B, and more particularly, clean it when there is a need, as illustrated with some role information exchange paths regarding register reading and cleaning (e.g. the role information exchange path between the BMC Client module and the HW Manager module of the node 100B and the role information exchange path between the HW Manager module and the 8 bits register of the node 100B).

When determining the role of the node 100A, the node 100A can send the information indicating the role of the node 100A to the node 100B through any of the aforementioned at least two communications paths (e.g. the NTB path and the BMC path), for example by using the role information exchange paths corresponding to the NTB path and/or by using the corresponding role information exchange paths regarding register writing and the corresponding role information exchange paths regarding register reading and cleaning, to notify the node 100B of the role of the node 100A. Similarly, when determining the role of the node 100B, the node 100B can send the information indicating the role of the node 100B to the node 100A through any of the aforementioned at least two communications paths (e.g. the NTB path and the BMC path), for example by using the role information exchange paths corresponding to the NTB path and/or by using the corresponding role information exchange paths regarding register writing and the corresponding role information exchange paths regarding register reading and cleaning, to notify the node 100A of the role of the node 100B. As a result, the two nodes 100A and 100B can be configured to exchange the role information (e.g. information indicating the role of the node 100A and information indicating the role of the node 100B) through the BMC path.

According to some embodiments, one of the two nodes 100A and the node 100B can be configured to determine the role of the other of the two nodes 100A and the node 100B. In this situation, when determining the role of the node 100B, the node 100A can send the information indicating the role of the node 100B to the node 100B through any of the aforementioned at least two communications paths (e.g. the NTB path and the BMC path), for example by using the role information exchange paths corresponding to the NTB path and/or by using the corresponding role information exchange paths regarding register writing and the corresponding role information exchange paths regarding register reading and cleaning, to notify the node 100B of the role of the node 100B. Similarly, when determining the role of the node 100A, the node 100B can send the information indicating the role of the node 100A to the node 100A through any of the aforementioned at least two communications paths (e.g. the NTB path and the BMC path), for example by using the role information exchange paths corresponding to the NTB path and/or by using the corresponding role information exchange paths regarding register writing and the corresponding role information exchange paths regarding register reading and cleaning, to notify the node 100A of the role of the node 100A. As a result, the two nodes 100A and 100B can be configured to exchange the role information (e.g. information indicating the role of the node 100A and information indicating the role of the node 100B) through the BMC path.

According to some embodiments, if role conflict occurs, at least one of the two nodes 100A and 100B may utilize the UI to output one or more hints for guiding the user to set the respective roles of the two nodes 100A and 100B manually.

TABLE 1

| Active | | Standby | |
| --- | --- | --- | --- |
| Status | Description | Status | Description |
| Running | System is normal | Running | System is normal |
| Standalone | Only active node service | Out of Sync | Keep old data. Need to sync from active |
| Stop | Service stopping | Abnormal | Failure(s) occur. Cannot provide service |
| Demote | Failure(s) occur. Start to perform failover | Promote | Takeover service |
| C2F | Copy memory data into Flash (M.2) | C2F | Copy memory data into Flash (M.2) |

Table 1 illustrates some examples of role and status regarding any node of the two nodes 100A and 100B and associated descriptions, where Active and Standby may represent the role of the active node and the role of the standby node, respectively. When the node is playing the role of the active node, examples of the status of the node may include, but are not limited to: the Running status, in which the system of the active node is normal and is operating correctly; the Standalone status, in which only the active node service (i.e. the service of the active node) is available; the Stop status, in which the service of the active node is stopping; the Demote status, in which the active node starts to perform failover for releasing the role of the active node when failure(s) of the active node occur; and the C2F status, in which the active node is performing a C2F operation such as that mentioned above to copy memory data (e.g. the data in the DRAM of the active node) into the one or more NVM storage devices (e.g. Flash memory) conforming to the M.2 specification in the active node (labeled "Flash (M.2)" for better comprehension). When the node is playing the role of the standby node, examples of the status of the node may include, but are not limited to: the Running status, in which the system of the standby node is normal and is operating correctly; the Out of Sync status, in which the standby node merely keeps old data of the active node and needs to synchronize (sync) the latest data (e.g. the latest version of data) from the active node to make the data stored in the standby node be equivalent to the latest data stored in the active node; the Abnormal status, in which the standby node cannot provide any service (e.g. the service of synchronizing the latest data from the active node to the standby node) when failure(s) of the standby node occur; the Promote status, in which the standby node takes over the service for changing the role thereof; and the C2F status, in which the standby node is performing a C2F operation such as that mentioned above to copy memory data (e.g. the data in the DRAM of the standby node) into the one or more NVM storage devices (e.g. Flash memory) conforming to the M.2 specification in the standby node (labeled "Flash (M.2)" for better comprehension).

Figure 8:
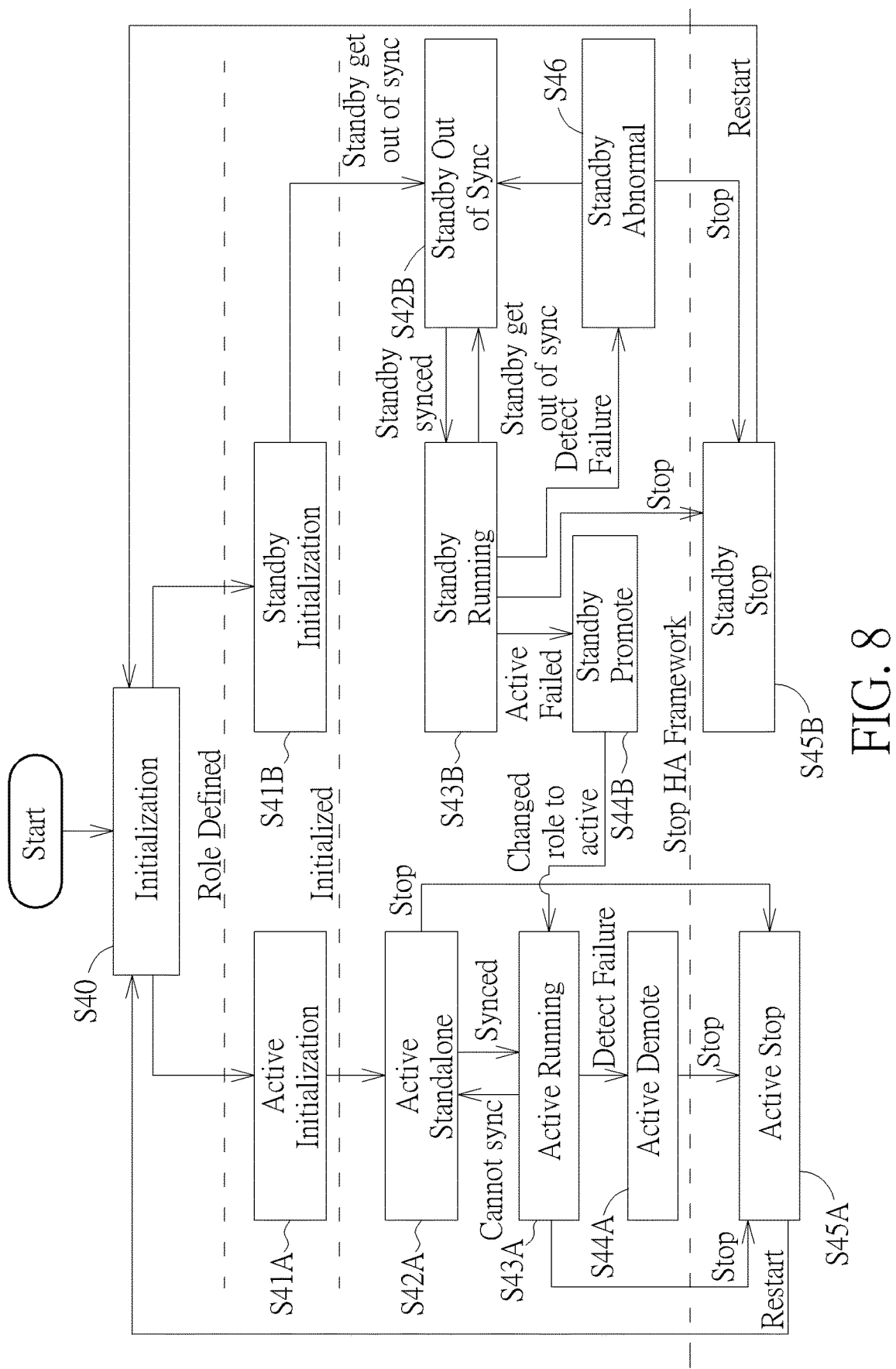
FIG. 8 illustrates a role and status transition control scheme of the method for performing node information exchange management of the AFA server according to an embodiment of the present invention.

FIG. 8 illustrates a role and status transition control scheme of the method for performing node information exchange management of the AFA server according to an embodiment of the present invention. Under control of the software layer (e.g. the software modules, such as the HA Framework module, etc.), the any node (e.g. each node) of the two nodes 100A and 100B can be configured to perform role and status transition control according to the role and status transition control scheme.

In Step S40, the node may perform initialization (e.g. the initialization of the system of the node).

In Step S41A, after the role of the node has been defined to be the active node, the node may perform active initialization (e.g. the initialization related to the role of the active node).

In Step S41B, after the role of the node has been defined to be the standby node, the node may perform standby initialization (e.g. the initialization related to the role of the standby node).

In Step S42A, after the node such as the active node has been initialized, the node may operate in the Standalone status of the role of the active node (labeled "Active Standalone" for brevity).

In Step S42B, after the node such as the standby node has been initialized, the node may operate in the Out of Sync status of the role of the standby node (labeled "Standby Out of Sync" for brevity), since the standby node may get out of synchronization with respect to the active node at this moment (labeled "Standby get out of sync" for brevity).

In Step S43A, when the node such as the active node has synchronized (synced) the latest data stored in the active node to the standby node, the node such as the active node may operate in the Running status of the role of the active node (labeled "Active Running" for brevity). For example, when the node such as the active node cannot synchronize (sync) the latest data stored in the active node to the standby node, Step S42A is entered.

In Step S43B, when the node such as the standby node has synchronized (synced) the latest data from the active node to make the data stored in the standby node be equivalent to the latest data stored in the active node, the node may operate in the Running status of the role of the standby node (labeled "Standby Running" for brevity). For example, when the standby node gets out of synchronization with respect to the active node (labeled "Standby get out of sync" for brevity), Step S42B is entered.

In Step S44A, when the node such as the active node detects failure thereof, the node may operate in the Demote status of the role of the active node (labeled "Active Demote" for brevity).

In Step S44B, when detecting that the active node failed (labeled "Active Failed" for brevity), the node such as the standby node may operate in the Promote status of the role of the standby node (labeled "Standby Promote" for brevity). As shown in FIG. 8, the arrow pointing toward Step S43A from Step S44B indicates that, when the node such as the standby node has changed the role thereof to the role of the active node (labeled "Changed role to active" for brevity), this node becomes the latest active node among the two nodes 100A and 100B.

In Step S45A, when the node such as the active node stops working (e.g. the node may stop the HA Framework module thereof), the node may enter the Stop status of the role of the active node (labeled "Active Stop" for brevity), where the node stops the service thereof. Afterward, the node may restart automatically.

In Step S45B, when the node such as the standby node stops working (e.g. the node may stop the HA Framework module thereof), the node may enter the Stop status of the role of the standby node (labeled "Standby Stop" for brevity), where the node stops the service thereof. Afterward, the node may restart automatically.

In Step S46, when the node such as the standby node detects failure thereof, the node may operate in the Abnormal status of the role of the standby node (labeled "Standby Abnormal" for brevity). For example, if the node such as the standby node stops working (e.g. the node may stop the HA Framework module thereof), Step S45B is entered; otherwise, Step S42B is entered.

According to some embodiments, the any node (e.g. each node) of the two nodes 100A and 100B can be configured to monitor the status of the node according to the working flow shown in FIG. 8, and more particularly, perform resource management on multiple types of resources of the node. For better comprehension, any component (e.g. software component) managed by the HA Framework module can be referred to as resource. Examples of an action being applied to the resource may include, but are not limited to: Start (e.g. enable), Stop (e.g. disable), Demote (e.g. make the resource become inactive; in particular, for the whole of the node, release or give up the role the active node), Promote (e.g. make the resource become active; in particular, for the whole of the node, change the role thereof from standby to active), C2F (e.g. perform the C2F operation), Set Standalone (e.g. set the node such as the active node to provide service to the user without synchronizing/copying the latest data stored in the active node to the standby node), and Cancel Standalone (e.g. set the node such as the active node to provide service to the user while synchronizing/copying the latest data stored in the active node to the standby node).

According to some embodiments, in the HA architecture implemented with the AFA server 100, the two nodes 100A and 100B such as the active node and the standby node may interact with each other to exchange the node information (e.g. the role information, the monitored information, etc.) through at least one portion (e.g. a portion or all) of the aforementioned at least two communications paths such as the BMC path and the NTB path. For example, the BMC path may be implemented with Inter-Integrated Circuit ($I^2C$) connection (e.g. $I^2C$ bus) between the respective BMCs 150A and 150B of the two nodes 100A and 100B. The BMC of the any node (e.g. each node) of the two nodes 100A and 100B may operate by itself and may also operate under control of the software layer (e.g. the software modules such as the connector, etc.) of this node, and more particularly, may access (e.g. read or write) the at least one register (e.g. the 8 bits register) of the register circuit of this node, and access the at least one register (e.g. the 8 bits register) of the register circuit of the other node through the BMC path and the BMC of the other node. The respective registers of the two nodes 100A and 100B may store the node information (e.g. the role information, the monitored information, etc.), for further use by one or more of the two nodes 100A and 100B.

As the BMC of the any node (e.g. each node) of the two nodes 100A and 100B is capable of operating independently, when the operating system (OS) among the program modules running on the node becomes abnormal (e.g. malfunctions), the two nodes 100A and 100B may exchange node information through the BMC path by using the two BMCs 150A and 150B. For example, in a situation where the NTB path becomes unavailable due to OS crash, the two BMCs 150A and 150B can continue working for the two nodes 100A and 100B, respectively, to deal with this issue (e.g. by performing a series of predetermined operations), where the BMC path between the two BMCs 150A and 150B in the respective hardware layers of the two nodes 100A and 100B still works. Additionally, both of the BMC path and the NTB path are implemented within the AFA server 100 and therefore are robust. Regarding communications between the two nodes 100A and 100B, coupling the two nodes 100A and 100B to each other with any external cable such as a network cable outside the AFA server 100 is not required.

Figure 9:
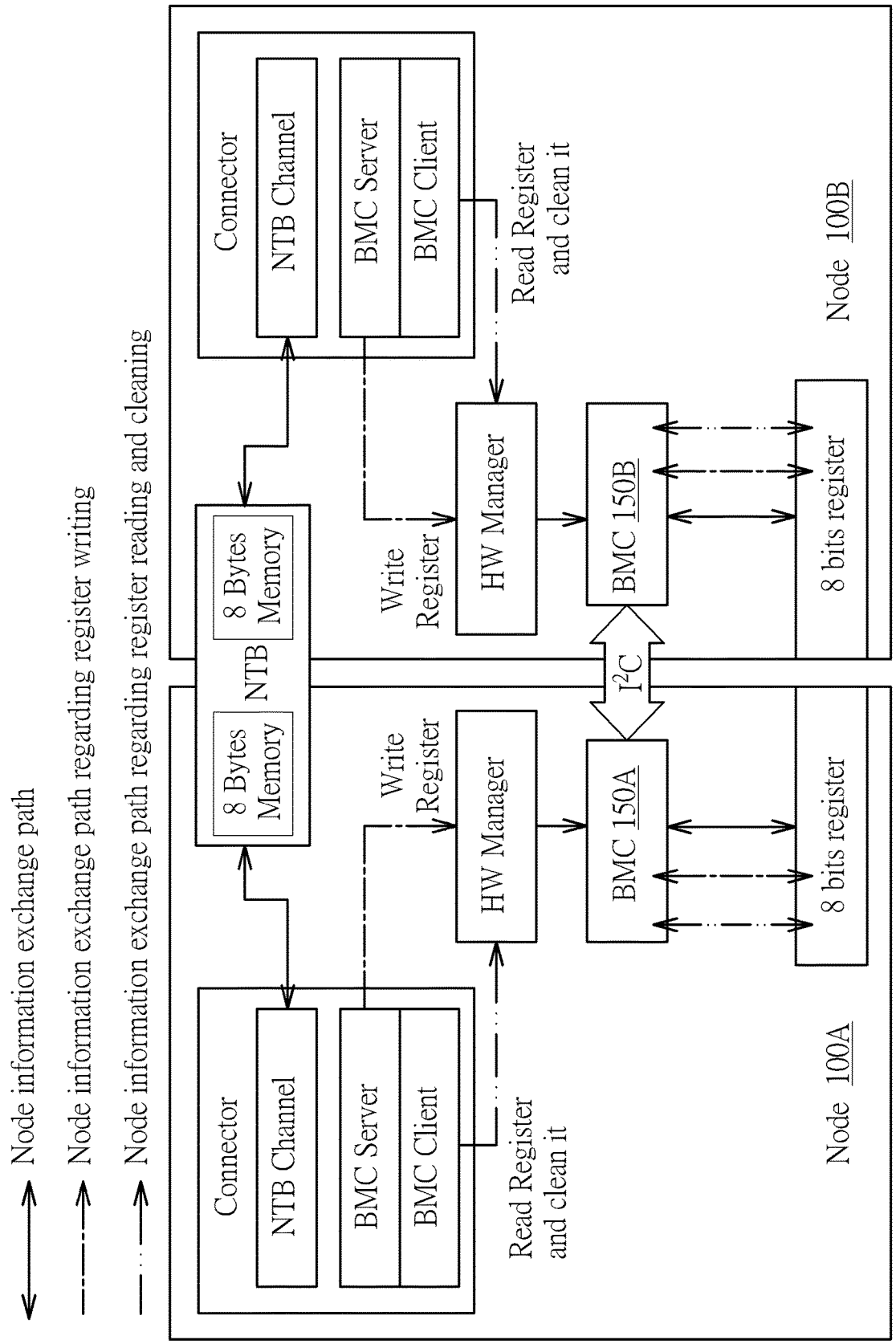
FIG. 9 illustrates a node information exchange control scheme of the method for performing node information exchange management of the AFA server according to an embodiment of the present invention.

FIG. 9 illustrates a node information exchange control scheme of the method for performing node information exchange management of the AFA server according to an embodiment of the present invention. In comparison with the architecture shown in FIG. 7, some implementation details such as the two BMCs 150A and 150B, the BMC path implemented by way of the I²C connection such as the I²C bus, the connections between the two BMCs 150A and 150B and the 8 bits registers, and two additional storage units implemented on the NTB path are further illustrated in this embodiment, where the role information exchange paths, the role information exchange paths regarding register writing, and the role information exchange paths regarding register reading and cleaning can also be referred to as node information exchange paths, node information exchange paths regarding register writing, and node information exchange paths regarding register reading and cleaning, respectively, since the role information can be one of multiple examples of the node information. For brevity, similar descriptions for this embodiment are not repeated in detail here.

As shown in FIG. 9, the two registers for exchanging the node information between the two nodes 100A and 100B through the BMC path (e.g. the two registers used by the BMCs 150A and 150B) can be 8 bits registers (e.g. 1-byte registers), and the two additional storage units for exchanging the node information between the two nodes 100A and 100B through the NTB path (e.g. the two additional storage units used by the respective processors 110A and 110B of the two nodes 100A and 100B) can be 8 bytes memories, but the present invention is not limited thereto. For example, the respective 8 bytes memories of the two nodes 100A and 100B can be implemented by way of respective partial storage regions of the respective DRAMs 120A and 120B of the two nodes 100A and 100B. In some examples, the respective sizes of the two registers and/or the respective sizes of the two additional storage units may vary.

TABLE 2

| Role | Status | Dec. | Binary | Description |
| --- | --- | --- | --- | --- |
| — | — | 0 | 0000 | Before system running |
| Active | Initialization | 1 | 0001 | Active node initializing |
| Active | Running | 2 | 0010 | Active node normally running |
| Active | Stop | 3 | 0011 | Active node stopping |
| Active | Standalone | 4 | 0100 | Active node cannot contact with standby node |
| Active | Demote | 5 | 0101 | Active node demote to standby |
| Standby | Initialization | 6 | 0110 | Standby node initializing |

TABLE 2-continued

| Role | Status | Dec. | Binary | Description |
| --- | --- | --- | --- | --- |
| Standby | Running | 7 | 0111 | Standby node normally running |
| Standby | Stop | 8 | 1000 | Standby node stopping |
| Standby | Promote | 9 | 1001 | Standby node promote to active |
| Standby | Abnormal | 10 | 1010 | Standby node is abnormal, and cannot takeover in this state |
| None | Initialization | 11 | 1011 | System initializing; it doesn't determine role yet |
| Standby | Out of Sync | 12 | 1100 | Standby node is out of sync, waiting active node to sync data, and cannot takeover in this state |
| Active | Stop OK | 13 | 1101 | Active node stopped successfully |
| Active | Stop fail | 14 | 1110 | Active node stopped unsuccessfully |
| — | — | 15 | 1111 | |

Table 2 illustrates some examples of encoding related to the role and the status/state) regarding the any node of the two nodes 100A and 100B and associated descriptions, where Active and Standby may represent the role of the active node and the role of the standby node, respectively. The node can encode the node information to generate an encoded result such as a binary code, and store the encoded result such as the binary code in one or more storage units of one or more of the two nodes 100A and 100B for further reference, and more particularly, store the node information in one or more registers among the two registers for exchanging the node information between the two nodes 100A and 100B through the BMC path, and store the node information in one or more additional storage units among the two additional storage units for exchanging the node information between the two nodes 100A and 100B through the NTB path. For example, the node information of each of the two nodes 100A and 100B can be expressed with the binary code having four bits (e.g. multiple candidate binary codes {0000, 0001, . . . , 1111} shown in the field "Binary" of Table 2, having equivalent decimal values {0, 1, . . . , 15} shown in the field "Dec." of Table 2, respectively).

The binary code may be equal to one of the multiple candidate binary codes {0000, 0001, . . . , 1111} listed in Table 2. For better comprehension, the candidate binary code 0000 may indicate the status before the AFA system is running (e.g. before starting the working flow shown in FIG. 8), where the symbol "-" in the fields "Role" and "Status" may stand for Don't Care; the candidate binary codes {0001, 0010, . . . , 0101} may indicate the Initialization status, the Running status, the Stop status, the Standalone status, and the Demote status of the role of the active node as described in Steps S41A, S43A, S45A, S42A, and S44A, respectively; the candidate binary codes {0110, 0111, . . . , 1010} may indicate the Initialization status, the Running status, the Stop status, the Promote status, and the Abnormal status of the role of the standby node as described in Steps S41B, S43B, S45B, S44B, and S46, respectively; the candidate binary code 1011 may indicate the Initialization status of the AFA system, where the AFA system does not determine the role of the node yet (labeled "None" in Table 2); the candidate binary code 1100 may indicate the Out of Sync status of the role of the standby node as described in Step S42B; the candidate binary codes {1101, 1110} may indicate the Stop OK status and the Stop fail status of the role of the active node, respectively, where the Stop OK status may represent that the active node has stopped successfully in Step S45A (e.g. the node is ready for restart without introducing any problem), while the Stop fail status may represent that the active node has stopped unsuccessfully in Step S45A (e.g.

although the node may restart automatically, the node may trigger one or more error handling procedures in response to the binary code being equal to the candidate binary code 1110; and the candidate binary code 1111 may be regarded as a reserved candidate binary code.

For example, each of the two registers (e.g. the 8 bits registers) can be configured to store the respective node information of the two nodes 100A and 100B, and each of the two additional storage units (e.g. the 8 bytes memories) can be configured to store the respective node information of the two nodes 100A and 100B as well as buffered data, etc., since the two additional storage units typically have greater storage capacity than that of the two registers, but the present invention is not limited thereto. Typically, it is unnecessary that each of the two registers and each of the two additional storage units store the respective node information of the two nodes 100A and 100B. For example, the any node (e.g. each node) of the two nodes 100A and 100B can write the node information of the any node to the register (e.g. the 8 bits register) of a remote node (e.g. the other node among the two nodes 100A and 100B) through the BMC path, for being read by the remote node; and the remote node can write the node information of the remote node to the register (e.g. the 8 bits register) of the any node through the BMC path, for being read by the any node. For another example, the any node (e.g. each node) of the two nodes 100A and 100B can write the node information of the any node to the register (e.g. the 8 bits register) of the any node, for being read by the remote node through the BMC path; and the remote node can write the node information of the remote node to the register (e.g. the 8 bits register) of the remote node, for being read by the any node through the BMC path. According to some embodiments, the bit count of the binary code may vary, and the respective sizes of the two register may vary correspondingly for supporting the storage requirement regarding the node information.

The AFA server 100 can exchange the node information (e.g. the node information expressed with the binary code) to maintain the HA architecture and guarantee correct HA control thereof, where the any node (e.g. each node) of the two nodes 100A and 100B can generate and update the node information thereof to indicate the role thereof and the status thereof such as whether the node is healthy or not, whether the node is alive or not, whether any failure occurs, etc., and more particularly, generate the latest version of the node information for indicating the latest role and the latest status of the node, to allow the remote node to operate adaptively according to the node information. More particularly, the AFA server 100 is equipped with the aforementioned at least two communications paths such as the BMC path and the NTB path, and all of them are implemented with internal connections within the shell of the AFA server 100 rather than using any external cable positioned outside of the shell of the AFA server 100. In addition, the AFA server 100 is capable of exchanging the node information through the BMC path when any OS crash of one of the two nodes 100A and 100B occurs since the two BMCs 150A and 150B can continue working for the two nodes 100A and 100B without being affected by the OS crash. For brevity, similar descriptions for this embodiment are not repeated in detail here.

For better comprehension, assume that P1, P2 and P3 represent the probability of malfunction of the NTB path, the probability of malfunction of the BMC path and the probability of malfunction of one of the two nodes 100A and 100B, respectively, where P1, P2 and P3 are positive values and are typically much less than one. As the two BMCs 150A and 150B and the BMC path will not be affected by the OS crash, it is typical that P2<P1, and the total probability (P1*P2*P3) of malfunction of all of the NTB path, the BMC path and the aforementioned one of the two nodes 100A and 100B is typically much less than any of P1, P2 and P3, and therefore may be regarded as almost reaching zero. For example, when the NTB path malfunctions (e.g. due to the OS crash), the AFA server 100 (e.g. the two nodes 100A and 100B) can exchange the node information through the BMC path, to correctly control the HA architecture according to the node information, for continuously providing the service to the user of the AFA server 100. When both of the NTB path and the BMC path malfunction, each of the two nodes 100A and 100B can determine its own role and status (e.g. the role and status corresponding to a certain row of table contents in Table 2) and operate correspondingly, for example, according to the working flow shown in FIG. 8, so the AFA server 100 can still continue providing the service to the user. When malfunction of all of the NTB path, the BMC path and the aforementioned one of the two nodes 100A and 100B occurs, the remaining node that is alive among the two nodes 100A and 100B can determine its own role and status (e.g. the role and status corresponding to a certain row of table contents in Table 2) and operate correspondingly, for example, according to the working flow shown in FIG. 8, so the AFA server 100 can still continue providing the service to the user. Therefore, the AFA server 100 can correctly control the HA architecture in various situations to maintain real HA (e.g. an extremely high degree of availability) of the AFA server 100.

According to some embodiments, in a situation where the two nodes 100A and 100B respectively play the role of the active node and the role of the standby node by default and one of them, such as the node 100A, malfunctions and therefore the node 100B becomes the latest active node, when a field application engineer (FAE) of the manufacturer of the AFA server 100 successfully fixes the node 100A (e.g. by replacing the node 100A with a new one or replacing a detachable component within the node 100A with a new one), the node 100A can obtain the node information of the node 100B through node information exchange to determine that the node 100B is playing the role of the active node, and therefore determine the role of the node 100A to be the latest standby node at this moment. In a situation where the two nodes 100A and 100B respectively play the role of the active node and the role of the standby node by default and one of them, such as the node 100B, malfunctions and therefore the node 100A is in the Standalone status of the role of the active node, when the FAE successfully fixes the node 100B (e.g. by replacing the node 100B with a new one or replacing a detachable component within the node 100B with a new one), the node 100B can obtain the node information of the node 100A through node information exchange to determine that the node 100A is playing the role of the active node, and therefore determine the role of the node 100B to be the latest standby node at this moment. For brevity, similar descriptions for these embodiments are not repeated in detail here.

Figure 10:
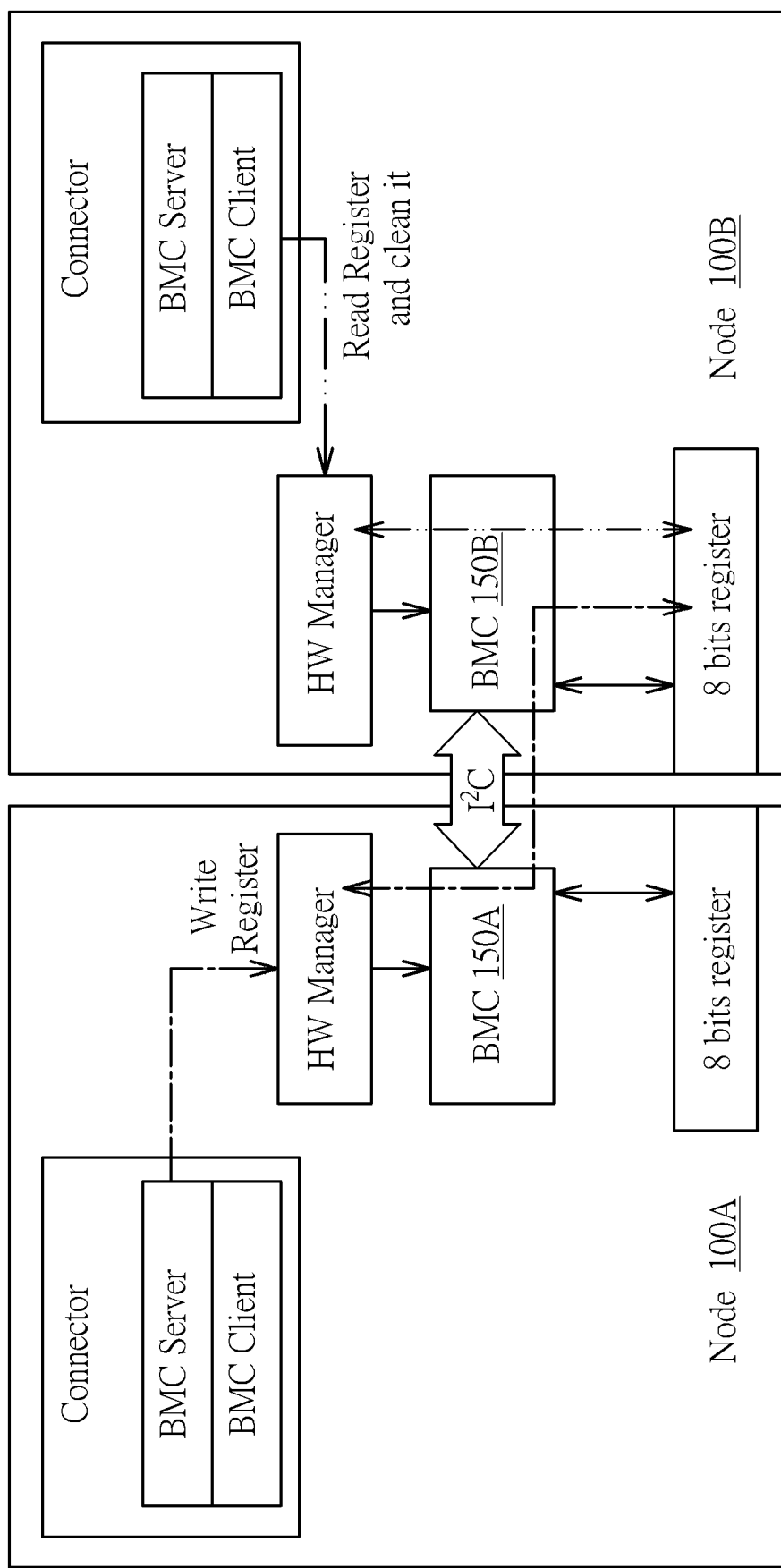
FIG. 10 illustrates a lock-based node information exchange control scheme of the method for performing node information exchange management of the AFA server according to an embodiment of the present invention.

FIG. 10 illustrates a lock-based node information exchange control scheme of the method for performing node information exchange management of the AFA server according to an embodiment of the present invention. Among eight bits {bit(7), bit(6), . . . , bit(0)} of any 8 bits register (e.g. each 8 bits register) of the respective 8 bits registers of the two nodes 100A and 100B, the AFA server 100 can utilize a certain bit such as the highest bit bit(7) as a lock bit, and utilize a set of bits such as the lower four bits {bit(3), bit(2), bit(1), bit(0)} as binary code bits of the binary code, where the highest bit bit(7) and the lowest bit bit(0)

can be regarded as Most Significant Bit (MSB) and Least Significant Bit (LSB), respectively, but the present invention is not limited thereto. Regarding the lock bit such as the highest bit bit(7), if bit(7)=0, only the remote side can access the any 8 bits register, where bit(7)=0 being always true means that remote crash of the remote side occurs; if bit(7)=1, only the local side can access the any 8 bits register, where bit(7)=1 being always true means that local crash of the local side occurs. For example, when the any 8 bits register is the 8 bits register of the any node, the local side and the remote side represent the any node and the remote node, respectively. For another example, when the any 8 bits register is the 8 bits register of the remote node, the local side and the remote side represent the remote node and the any node, respectively.

For better comprehension, assume that during node information exchange between the two nodes 100A and 100B, the node 100B is trying to get the node information of the node 100A through the BMC path. For example, the node 100B (e.g. the BMC Client module running thereon) can initialize (e.g. reset or clear) the 8 bits register of the node 100B with a default value such as 00000000, to make {bit(7), bit(6), . . . , bit(0)}=00000000. Afterward, the AFA server 100 can perform a series of operations as follows:

(1) the node 100A (e.g. the BMC Server module running thereon) can read the 8 bits register of the node 100B to check the lock bit such as the highest bit bit(7), and determine that bit(7)=0, indicating that writing can be performed;

(2) the node 100B (e.g. the BMC Client module running thereon) can read the 8 bits register of the node 100B to check the lock bit such as the highest bit bit(7), and determine that bit(7)=0, and therefore determine failure of this reading occurs, where no change of bit(7) indicates that the node 100A has not written into the 8 bits register of the node 100B, so the node 100B (e.g. the BMC Client module running thereon) has not get the node information of the node 100A, such as a first version of the node information;

(3) the node 100A (e.g. the BMC Server module running thereon) can write the 8 bits register of the node 100B, and more particularly, save the node information of the node 100A, such as the first version of the node information, into the 8 bits register of the node 100B and set bit(7)=1;

(4) the node 100A (e.g. the BMC Server module running thereon) can read the 8 bits register of the node 100B to check the lock bit such as the highest bit bit(7), and determine that bit(7)=1, and therefore determine failure of trying the next writing occurs, where no change of bit(7) indicates that the node 100B has not read the node information such as the first version of the node information;

(5) the node 100B (e.g. the BMC Client module running thereon) can read the 8 bits register of the node 100B to check the lock bit such as the highest bit bit(7), and determine that bit(7)=1, and therefore obtain the node information such as the first version of the node information;

(6) the node 100B (e.g. the BMC Client module running thereon) can clear the 8 bits register of the node 100B with the default value such as 00000000, to make {bit(7), bit(6), . . . , bit(0)}=00000000;

but the present invention is not limited thereto. For example, the two nodes 100A and 100B can be exchanged in the above operations, and the associated node information exchange paths as illustrated in FIG. 10 can be mirrored with respect to an imaginary vertical line between the two nodes 100A and 100B (e.g. from the left-hand side to the right-hand side or from the right-hand side to the left-hand side). During node information exchange between the two nodes 100A and 100B, the node 100A can try to get the node information of the node 100B through the BMC path in a similar manner.

According to some embodiments, the any node (e.g. each node) of the two nodes 100A and 100B may detect that the status/state of the remote node as indicated by the node information obtained from the NTB path and the status/state of the remote node as indicated by the node information obtained from the BMC path are inconsistent. In this situation, the node can determine whether the NTB path is normal or abnormal and whether the BMC path is normal or abnormal according some monitoring results regarding the NTB path and the BMC path, to select a corresponding operation from multiple predetermined operations according to at least one predetermined rule as a subsequent operation to be performed. For example, if the monitoring results indicate that both of the NTB path and the BMC path are normal, the node can exchange the node information again; if the monitoring results indicate that the NTB path is abnormal and the BMC path is normal, the node can trust and use the status/state of the remote node as indicated by the node information obtained from the BMC path; if the monitoring results indicate that the NTB path is normal and the BMC path is abnormal, the node can trust and use the status/state of the remote node as indicated by the node information obtained from the NTB path; and if the monitoring results indicate that both of the NTB path and the BMC path are abnormal, which may be regarded as a Split-Brain condition, the node can perform Split-Brain processing. Regarding the Split-Brain processing, when the node is playing the role of the standby node, the node can turn off itself; and when the node is playing the role of the active node, the node can enter the Standalone status of the role of the active node.

Some discussions regarding the Split-Brain condition and a One-Node-OS-Crash condition (in which OS crash of one of the two nodes 100A and 100B occurs) may be described as follows:

(1) In Case #1 regarding the Split-Brain condition, NTB disconnection occurs (e.g. the NTB path is unusable due to physical damage, OS problems, etc.), and taking the architecture shown in FIG. 10 as an example, the node 100B cannot read the local register (e.g. the 8 bits register of the node 100B) and cannot write (or read) the remote register (e.g. the 8 bits register of the node 100A);

(2) In Case #2 regarding the Split-Brain condition, NTB disconnection occurs (e.g. the NTB path is unusable due to physical damage, OS problems, etc.), and taking the architecture shown in FIG. 10 as an example, the node 100B can read the local register (e.g. the 8 bits register of the node 100B) but the lock bit of the local register is always 0, and the node 100B cannot write (or read) the remote register (e.g. the 8 bits register of the node 100A);

(3) In Case #3 regarding the One-Node-OS-Crash condition, NTB disconnection occurs (e.g. the NTB path is unusable due to physical damage, OS problems, etc.), and taking the architecture shown in FIG. 10 as an example, the node 100B can read the local register (e.g. the 8 bits register of the node 100B) but the lock bit of the local register is always 0, and the node 100B can write the remote register (e.g. the 8 bits register of the node 100A) but the lock bit of the remote register is always 1;

where it is hard for the AFA server 100 to encounter the Split-Brain condition (e.g. Cases #1 and #2) since the BMC path is quite robust. According to some experiments regarding the AFA server 100, the Split-Brain condition never occurs.

Figure 11:
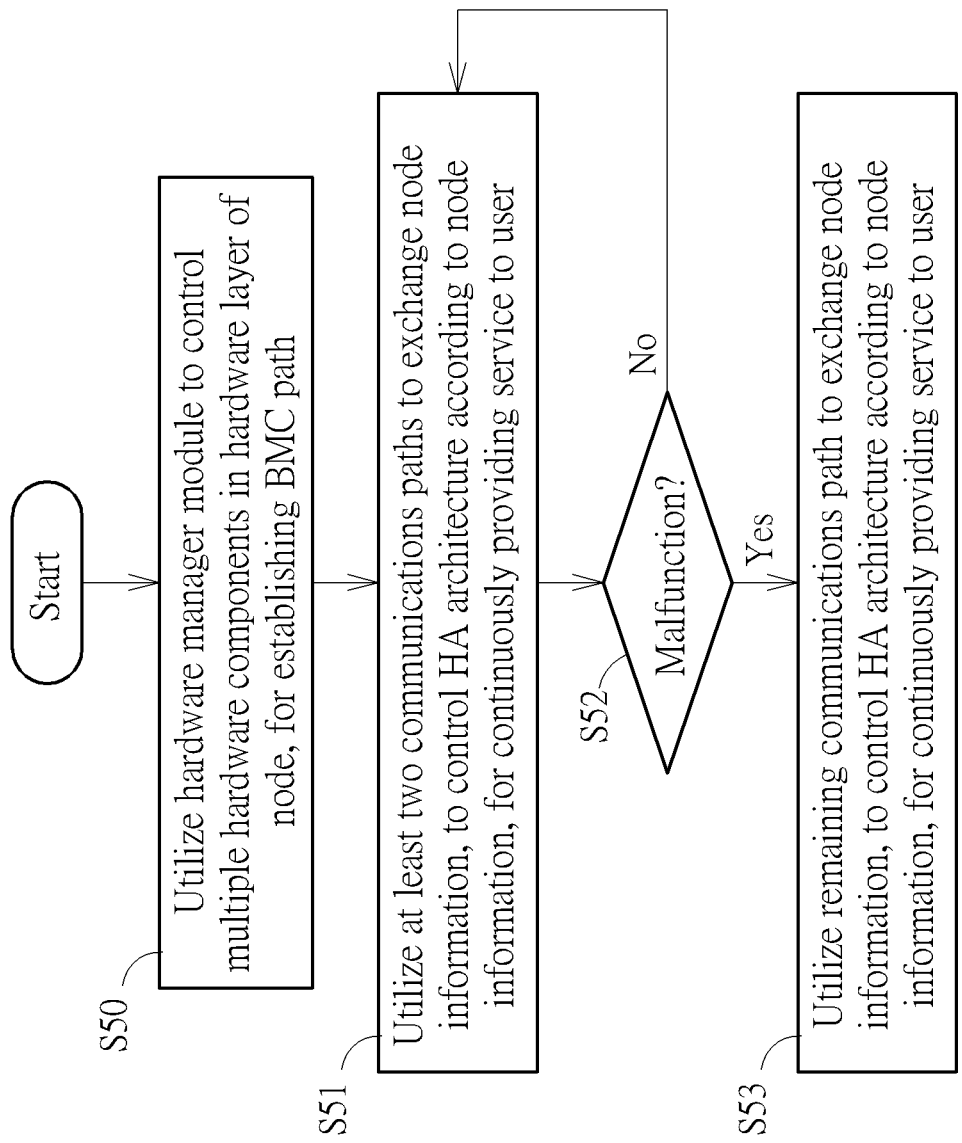
FIG. 11 illustrates a flowchart of the method for performing node information exchange management of the AFA server according to an embodiment of the present invention.

FIG. 11 illustrates a flowchart of the method for performing node information exchange management of the AFA server according to an embodiment of the present invention. The any node (e.g. each node) of the two nodes 100A and 100B can perform node information exchange through at least one portion (e.g. a portion or all) of the at least two communications paths, where any of the at least two communications paths can be regarded as a backup communications path of another of the at least two communications paths. For example, the node information of the any node indicates the role and status of the any node in the HA architecture, and the node information of the remote node indicates the role and status of the remote node in the HA architecture.

In Step S50, the any node can utilize the hardware manager module (e.g. the HW Manager module) among the program modules running on the node to control multiple hardware components (e.g. the HW components) in the hardware layer of the node, for establishing the BMC path between the an node and the remote node among the two nodes 100A and 100B, where the BMC path is established between the BMC of the node and a corresponding BMC of the remote node (e.g. the BMCs 150A and 150B).

In Step S51, the any node and the remote node can utilize the at least two communications paths to exchange the respective node information of the two nodes 100A and 100B, to control the HA architecture of the AFA server 100 according to the respective node information of the two nodes 100A and 100B, for continuously providing the service to the user of the AFA server 100, where the at least two communications paths comprise the NTB path and the BMC path, and the NTB path is established between the NTB communications circuit of the node and a corresponding NTB communications circuit of the remote node (e.g. the NTB communications circuits 140A and 140B). For example, each of the respective node information of the two nodes 100A and 100B can be encoded as the binary code, for being exchanged between the two nodes 100A and 100B.

In Step S52, the any node can check whether malfunction of any communications path of the at least two communications paths occurs. If Yes, Step S53 is entered; if No, Step S51 is entered.

In Step S53, in response to the malfunction of the any communications path (e.g. the NTB path or the BMC path) of the at least two communications paths, the any node and the remote node can utilize at least one remaining communications path (e.g. the BMC path or the NTB path) of the at least two communications paths to exchange the respective node information of the two nodes 100A and 100B, to control the HA architecture of the AFA server 100 according to the respective node information of the two nodes 100A and 100B, for continuously providing the service to the user.

According to this embodiment, the any node can utilize the register circuit (e.g. one of the register circuits 152A and 152B, and more particularly, the at least one register therein, such as the 8 bits register in the node) among the multiple hardware components in the hardware layer of the node to store one or more of the respective node information of the two nodes 100A and 100B. For example, the remote node can write the node information of the remote node to the register circuit of the any node through the BMC path, for being read by the any node, and the any node can write the node information of the any node to a corresponding register circuit (e.g. another of the register circuits 152A and 152B, and more particularly, the at least one register therein, such as the 8 bits register in the node) of the remote node through the BMC path, for being read by the remote node. For another example, the any node can write the node information of the any node to the register circuit of the any node, for being read by the remote node through the BMC path, and the remote node can write the node information of the remote node to the corresponding register circuit of the remote node, for being read by the any node through the BMC path. For brevity, similar descriptions for this embodiment are not repeated in detail here.

For better comprehension, the method may be illustrated with the working flow shown in FIG. 11, but the present invention is not limited thereto. According to some embodiments, one or more steps may be added, deleted, or changed in the working flow shown in FIG. 11.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing node information exchange management of an all flash array (AFA) server, the method comprising:

utilizing a hardware manager module among multiple program modules running on any node of multiple nodes of the AFA server to control multiple hardware components in a hardware layer of the any node, for establishing a Board Management Controller (BMC) path between the any node and a remote node among the multiple nodes, wherein the multiple hardware components in the hardware layer of the any node comprise a BMC, and the BMC path is established between the BMC of the any node and a corresponding BMC of the remote node;

utilizing at least two communications paths to exchange respective node information of the any node and the remote node, to control a high availability (HA) architecture of the AFA server according to the respective node information of the any node and the remote node, for continuously providing a service to a user of the AFA server, wherein the at least two communications paths comprise a Non-Transparent Bridge (NTB) path and the BMC path, and the NTB path is established between a NTB communications circuit of the any node and a corresponding NTB communications circuit of the remote node; and in response to malfunction of any communications path of the at least two communications paths, utilizing at least one remaining communications path of the at least two communications paths to exchange the respective node information of the any node and the remote node, to control the HA architecture of the AFA server according to the respective node information of the any node and the remote node, for continuously providing the service to the user.

2. The method of claim 1, wherein the multiple hardware components in the hardware layer of the any node further comprise a register circuit; and the any node utilize the register circuit to store one or more of the node information of the any node and the node information of the remote node.

3. The method of claim 1, wherein the multiple hardware components in the hardware layer of the any node further comprise a register circuit; and the remote node writes the node information of the remote node to the register circuit of the any node through the BMC path, for being read by the any node.

4. The method of claim 3, wherein the any node writes the node information of the any node to a corresponding register circuit of the remote node through the BMC path, for being read by the remote node.

5. The method of claim 1, wherein the multiple hardware components in the hardware layer of the any node further comprise a register circuit; and the any node writes the node information of the any node to a corresponding register circuit of the remote node through the BMC path, for being read by the remote node.

6. The method of claim 1, wherein the multiple hardware components in the hardware layer of the any node further comprise a register circuit; and the any node writes the node information of the any node to the register circuit of the any node, for being read by the remote node through the BMC path.

7. The method of claim 6, wherein the remote node writes the node information of the remote node to a corresponding register circuit of the remote node, for being read by the any node through the BMC path.

8. The method of claim 1, wherein the multiple hardware components in the hardware layer of the any node further comprise a register circuit; and the remote node writes the node information of the remote node to a corresponding register circuit of the remote node, for being read by the any node through the BMC path.

9. The method of claim 1, wherein the node information of the any node indicates a role and status of the any node in the HA architecture, and the node information of the remote node indicates a role and status of the remote node in the HA architecture.

10. The method of claim 1, wherein each of the respective node information of the any node and the remote node is encoded as a binary code, for being exchanged between the any node and the remote node.

11. An all flash array (AFA) server, comprising:
multiple nodes, wherein any node of the multiple nodes comprises:
at least one processor, arranged to control operations of the any node under control of multiple program modules; and
multiple hardware components in a hardware layer of the any node, wherein the multiple hardware components in the hardware layer of the any node comprise a Board Management Controller (BMC) and a Non-Transparent Bridge (NTB) communications circuit; and
a plurality of storage devices, the plurality of storage devices comprising multiple groups of storage devices, for storing data for the AFA server;
wherein:
the any node utilizes a hardware manager module among multiple program modules running on the any node to control the multiple hardware components in the hardware layer of the any node, for establishing a BMC path between the any node and a remote node among the multiple nodes, wherein the BMC path is established between the BMC of the any node and a corresponding BMC of the remote node;
the any node and the remote node utilize at least two communications paths to exchange respective node information of the any node and the remote node, to control a high availability (HA) architecture of the AFA server according to the respective node information of the any node and the remote node, for continuously providing a service to a user of the AFA server, wherein the at least two communications paths comprise a NTB path and the BMC path, and the NTB path is established between the NTB communications circuit of the any node and a corresponding NTB communications circuit of the remote node; and
in response to malfunction of any communications path of the at least two communications paths, the any node and the remote node utilize at least one remaining communications path of the at least two communications paths to exchange the respective node information of the any node and the remote node, to control the HA architecture of the AFA server according to the respective node information of the any node and the remote node, for continuously providing the service to the user.

* * * * *